United States Patent [19]
Clawson

[11] Patent Number: 6,112,304
[45] Date of Patent: Aug. 29, 2000

[54] DISTRIBUTED COMPUTING ARCHITECTURE

[75] Inventor: James Clawson, Orem, Utah

[73] Assignee: Zipsoft, Inc., Provo, Utah

[21] Appl. No.: 08/919,081

[22] Filed: Aug. 27, 1997

[51] Int. Cl.$^7$ ...................................................... H04L 9/00
[52] U.S. Cl. ..................................... 713/156; 395/200.32
[58] Field of Search .......................... 380/4, 25; 395/683, 395/200.31, 200.32, 800.28; 713/156, 175, 181

[56] References Cited

U.S. PATENT DOCUMENTS

| | | | |
|---|---|---|---|
| 4,502,128 | 2/1985 | Okajima et al. | 364/900 |
| 4,604,686 | 8/1986 | Reiter et al. | 364/200 |
| 4,774,655 | 9/1988 | Kollin et al. | 364/200 |
| 4,839,853 | 6/1989 | Deerwater et al. | 364/900 |
| 5,197,005 | 3/1993 | Shwartz et al. | 364/419 |
| 5,311,591 | 5/1994 | Fischer | 380/4 |
| 5,337,360 | 8/1994 | Fischer | 380/4 |
| 5,365,587 | 11/1994 | Campbell et al. | 380/25 |
| 5,390,247 | 2/1995 | Fischer | 380/25 |
| 5,412,717 | 5/1995 | Fischer | 380/4 |
| 5,596,744 | 1/1997 | Dao et al. | 395/610 |
| 5,596,748 | 1/1997 | Kleewein et al. | 395/610 |
| 5,748,960 | 5/1998 | Fischer | 395/683 |

OTHER PUBLICATIONS

"Accessing the World of Information: Open Database Connectivity (ODBC)", Anon., *Microsoft Corp.*, 1995, pp. 1–10.

"ACM Computing Surveys", P. Wegner et al., *ACM Computing Surveys*, vol. 27, No. 2, Jun. 1995, pp. Masthead, 142–195.

"Applying an information gathering architecture to Netfind: a white pages tool for a changing and growing Internet—reviews", M. Schwartz et al., *http://www.acm.org/pubs/citations/journals/ton/1994-2-5/p426-schwartz*, no later than Jun. 26, 1997, pp. 1–3.

"Automated resolution of semantic heterogeneity in multi-databases—Abstract and Review", M. Bright et al., http://www.acm.org/pubs/citations/journal/tods/1994-19-2/p212-bright, no later than Jun. 26, 1997, pp. 1–2.

"The Basics of Web Development", S. Gillmor, *Byte*, Apr. 1997, pp. 41–42.

"Bridging the Data Archipelago", M. Davydov, *Database Programming and Design*, Aug. 1997, pp. 54–58, 60, 62–63.

"Bringing Up Browsers", L. Grunin, *Windows Sources*, Jun. 1997, pp. 64–66.

"Bulletproof Online Backups", J.Lyon, *PC Computing*, Jun. 1997, p. 128, Masthead.

(List continued on next page.)

*Primary Examiner*—Salvatore Cangialosi
*Attorney, Agent, or Firm*—Computer Law ++

[57] ABSTRACT

A method and system for utilizing resources according to a novel computing architecture are provided, including an operational environment for denizen processes and a way for denizens to travel between locations. A denizen process is capable of receiving instructions, evaluating different locations in the operational environment in view of the received instructions, selecting a location based on that evaluation, moving itself to the selected location, and executing at least a portion of the received instructions at the selected location. To avoid distributing viruses and to reduce bandwidth requirements, denizens can move by specifying information for building a denizen by using code stored in a library at a destination location. The denizen is also capable of reproducing and archiving itself, of detecting an error in itself, and of attempting to replace itself with an archived version of itself or attempting to rebuild itself from library components. In addition, the denizen is capable of modifying itself by dynamically loading and unloading code. Denizens can flexibly allocate processors because each denizen can individually decide where it should execute. Application areas for employing the novel architecture include database management and natural language translation.

58 Claims, 7 Drawing Sheets

OTHER PUBLICATIONS

"Calibrating the Query Optimizer Cost model of IRO–DB, an Object–Oriented Federated Database System—Abstract", G. Gardarin et al., http://ww.research.microsoft.com, No later than Jun. 26, 1997, p. 1.

"The Carnot Heterogeneous Database Project: Implemented Applications", M. Singh et al., *Distributed and Parallel Databases,* 5, 1997, pp. 207–225.

Review "A comparative analysis of methodologies for database schema integration—Review", C. Batini et al., http://www.acm.org/pubs/citations/journal/surveys, No later than Jun. 26, 1997, pp. 1–2.

"Computer Associates Has It All, Plus an Image Problem", R. Narisetti, *The Wall Street Journal,* Jan. 8, 1998, p. B4.

"The COntext INterchange Mediator Prototype", S. Bressan et al., ACM, 1997, pp. 525–527.

"Data Security for Mobile and Remote Users", S. Cobb, *Database Web Advisor,* May 1997, pp. 68–71.

"Selecting the hardware platform for a data warehouse . . . ", R. Hill, *Database Programming and Design,* Aug. 1997, pp. 47,48,50,52.

"DATAPLEX: an access to heterogeneous distributed databases—Abstract, Review", C. Chung, http://www.acm.org/pubs/citations/journals/cacm, No later than Jun. 26, 1997, pp. 1–2.

"DIRECT: a query facility for multiple databases—Abstract, Review", U. Merz et al., http:/www.acm.org/pubs/citations/journals/tois, No later than Jun. 26, 1997, pp. 1–2.

"A Deadlock Checkpointing Scheme for Multidatabase Systems", P. Scheuermann et al., *IEEE,* 1992, pp.184–191.

"Distributed Objects: The Next Big Thing", P. Youngworth, *Databased Web Advisor,* May 1997, pp. 48–55.

"Distributed Operating Systems", A. Tanenbaum, *Prentice Hall,* 1995, pp. 169–244.

"Federated database sytems for managing distributed, heterogeneous, and autonomous databases—Abstract, Review", A. Sheth et al., http://www.acm.org/pubs/citations/journals/surveys, No later than Jun. 26, 1997, pp. 1–2.

"Hanging Out an Internet Shingle", D. Seachrist, *Byte,* Apr. 1997, pp.136–140.

"The Harvest information discovery and access system", C. Mic Bowman et al., *Computer networks and ISDN Systems* 28, 1995, pp. 119–125.

"Heterogeneous distributed database systems for production use—Abstract and Review", G. Thomas et al., http://www.acm.org/pubs/citations/journals/surveys, No later than Jun. 26, 1997, pp. 1–2.

"The Hitch–Hikers Guide to Evolutionary Computation", J. Heitkötter et al., ed., http://alife.santafe.edu, Jun. 20, 1997, various pages.

"How to Improve RDBMSes", N. Alur et al., *Byte,* Apr. 1997, pp. 115,116,118,120.

"HyPursuit: A Hierarchical Network Search Engine that Exploits Content–Link Hypertext Clustering", R. Weiss et al., 7th ACM Conference on Hypertext, 1996, pp. 180–193.

"Illinois Concert Project", Unknown, http://www–csag/cs/uiuc/edu/projects/concert.html, no later than Aug. 22, 1997, various pages.

"Inferno Walk–Through", Anon., http://www.lucent-inferno.com/walk.html, 1997, pp. 1–2.

"InfoSleuth: Networked Exploitation of Information using Semantic Agents", D. Woelk et al., *SPRING COMPCON,* 1995, pp. 147–152.

"Intelligent Databases, Object–Oriented Deductive Hypermedia Technologies", K. Parsaye et al., *John Wiley & Sons, Inc.,* 1989, pp. 201–204, 423–433.

"Internet FastFind", Unknown, *Symnatec Corp.,* 1996, pp. 1–2.

"The Internet's Wide–Open Network. . . ", F. Campos, *Database Programming and Design,* Apr. 1997, pp. 26–30, 32,34,35.

"An Introduction to Database Systems", C.J. Date, *Addison–Wesley Publishing Company,* 1983, pp. 291–341.

"Interoperability of multiple autonomous databases—Abstract and Review", W. Litwin et al., http://www.acm.org/pubs/citations/journals/surveys, No later than Jun. 26, 1997, pp. 1–2.

"Keep Tabs on Your Web Traffic", D. Gerding, *PC Computing,* Jun. 1997, p. 168, Masthead.

"Let's Talk", M. Foody, *Byte,* Apr. 1997, pp.99–102.

"Managing Heterogenous Multi–System Tasks to Support Enterprise–Wide Operations", N. Krishnakumar et al., *Distributed and Parallel Databases,* 3, 1995, pp. 155–186.

"MaxSol Inc", Anon. *MaxSol, Inc.,* 1996, pp.1–2.

"MicroPages Electronic Data Publishing Tool Set", Unknown, *Microlytics,* No later than Oct. 10, 1996, selected pages.

"The model–assisted global query system for multiple databases in distributed enterprises—Abstract", W. Cheung et al., *ACM Transactions on Information Systems,* 1996, p.1.

"A New Foundation", M. Tamer, *Database Programming & Design,* Mar. 1997, pp. 38–40, 42–43.

"Object orientation in multidatabase systems—Abstract & Review", E. Pitoura et al., *ACM Computing Surveys* vol. 27, No.2, Jun. 1995, pp.1–2.

"One–Button Java Publishing", R. Schwerin, *PC Computing,* Jun. 1997, p. 160, Masthead.

"The Password is Cluster", D. Stodder, *Database Programming & Design,* Jul. 1997, pp. 5–6.

"Parallel architecture for component testing", J.D. McGregor, *Journal of Object–Oriented Programming,* May 1997, pp. 10–14, Masthead.

"Professional DCOM Programming", R. Grimes, *Wrox Press Ltd.,* 1997, Front Page, pp. 9–47, 143–166, 319–344.

"Replication Everywhere", R. Dobson, *Byte,* Apr. 1997, pp. 34, 36.

"Reporting for the Enterprise", C. Comaford, *Database Programming & Design,* Aug. 1997, pp. 82–85.

"RDBMSes Get a Make–Over", J.–L. Weldon, *Byte,* Apr. 1997, pp. 109–110, 112–114.

"State of JDK", D. Larson, *Web Developer,* May/Jun. 1997, pp. 54–59.

"Strong Recoverability in Multidatabase Systems", Y. Breitbart et al., *IEEE,* 1992, 170–175.

"Committing to Three–tier Architecture", C. Thompson, *Database Programming & Design,* Unknown, pp. 27–30, 32–33.

"VAGUE: a user interface to relational databases that permits vague queries—Review", A. Motro, *ACM Transactions on Information Systems,* vol. 6, No.3, Jul. 1998, pp.1–2.

"Visigenic: Developing Database Independent applications with ODBC", Unknown, http://www.visigenic.com/info/odbc.html, no later than Feb. 12, 1997, pp. 1–8.

"Warehousing Meets the Web", M. Madsen, *Database Programming & Design,* Aug. 1997, pp. 37–38, 40–42, 44–45.

"The Whole Internet: User's Guide & Catalog", E. Krol, *O'Reilly & Associates, Inc.,* 1994, pp. 233–239, Masthead.

"Working with objects: A three–model architecture for the analysis of information systems", T. Reenskaug, *Journal of Object–Oriented Programming,* May 1997, pp. 22–29, Masthead.

"You Make the Protocol: Active nodes and networks.", K. Morrow, *Wired,* Oct. 1997, p. 80.

One Huge Computer, K. Kelly & S. Reiss., *Wired,* Aug. 1998, pp. 128–133, 168–170.

DISTRIBUTED COMPUTING ARCHITECTURE

FIELD OF THE INVENTION

The present invention relates to computing system architectures, and more particularly to a distributed system computing architecture which provides an operational environment for self-reproducing, self-archiving, self-repairing mobile denizen processes.

TECHNICAL BACKGROUND OF THE INVENTION

The general advantages of distributed computing are well-known. As computing power becomes more widely available at lower prices, the most cost-effective approach to many problems may involve harnessing many connected processors together into one large system. Some computing problems, such as tracking retail sales and inventory, are inherently distributed. Distributing computing workloads may also improve reliability, since the failure of a single processor in a distributed system will not necessarily bring all work on a given problem to a halt.

A variety of tools are available for building distributed computing systems. Shared memory, remote procedure calls, "blackboards," event-driven modules, and other mechanisms allow communication between processes that are running in a cooperative manner in separate memory regions on one or more computers. These mechanisms, in combination with networking protocols, domain name systems, distributed operating systems, and distributed file systems, allow communication between processes running on separate computers and efficient use of resources by such processes. The Internet, local area networks, metropolitan area networks, wide area networks, wireless networks, satellite networks, optical networks, and other collections of connected and/or connectable computers provide processing power, memory, disk space, and other resources, including facilities for inter-process communication. A host of secret key, public key, and other cryptographic methods can be used to enhance the security of interprocess communications. Java, Ada, C++, assembly, and other programming languages or development environments support the creation, testing, and refinement of interrupt handlers, concurrent processes, threads, multiprocessing systems, exception handlers, and other concurrent and/or distributed programming constructs.

As a result, many different approaches to distributed computing have been tried, and even more have been proposed. Each distributed computing system, whether it has been implemented or not, embodies numerous design choices, making it one approach selected from an enormous universe of possibilities. Some of the most important design choices include deciding how the distributed processes communicate with one another and with users, how security constraints are defined and enforced, how and when processors and processes should be brought together and separated, how responsibility is divided between processes, how processes are updated to reflect new data or instructions, and how processes should detect and handle errors.

Each of these broad design questions leads to additional, more specific questions. For instance, determining how to match processors with processes typically involves (among other considerations) selection of a processor allocation algorithm. As explained in the text "Distributed Operating Systems" by Andrew S. Tanenbaum, ISBN 0-13-219908-4 (1995), this choice in turn involves key choices between deterministic versus heuristic algorithms, centralized versus distributed algorithms, optimal versus suboptimal algorithms, local versus global algorithms, and sender-initiated versus receiver-initiated algorithms.

When security, error control, communication, update propagation, and other broad design issues are considered in greater depth, they likewise give rise to a host of additional, more specific questions. Should memory be shared? If so, how should consistency between different copies of the "same" data be maintained? What sort of errors can be detected by a process, and how should each type of error be handled? What should a given process do itself, and what should it ask other processes to do? What formats should instructions and data be stored in? How closely should a given process be tied to the specific hardware and operating system of the computer it is running on? Should a program be loaded into memory for execution as one complete, self-contained block or should components be loaded only as they are needed? How should version control be accomplished?

The design task is made even more difficult by the fact that answering one design question in a particular way may change the importance of other questions or raise new ones. For instance, if a process is sufficiently independent of the hardware being used to avoid disk accesses after being launched, then the process can run on both diskless computers and on computers that have a local disk. Disk storage formats for use while the process runs apparently become irrelevant while the options for recovering from serious errors are different than they would be if checkpoints could be logged on a local disk.

Known distributed system architectures answer design questions in very different ways, but some design questions tend to be answered in the same or similar ways in most systems. For instance, most systems contain a specialized process that is responsible for matching other processes with available processors. This "process manager" is also known by names such as the "scheduler," "load-balancer," "transfer manager," "usage table coordinator," "process queue manager," and "processor allocator." Decisions about how best to allocate processors are made by the process manager, sometimes with little or no input from the processes that will run on the assigned processors. Some systems include one process manager per processor or one per computer, rather than one for the entire distributed system, but all of the process managers in a given system typically use a single algorithm to match processes with processors.

Likewise, in most known distributed systems, the types of errors that can be detected are limited to (a) input errors, and (b) missing or unavailable resources. For instance, data input from a file, a socket, or a user can be checked for values outside a predetermined range, or it can be checked against another copy of the data. The contents of a network packet or a Java applet may be checked by calculating a checksum and comparing it with a checksum computed earlier. If the comparison detects an error, packet retransmission or applet reloading can be requested, or the user can be asked to supply different content.

With regard to resource errors, a process may determine that files, such as dynamically linked library files or requested text files, cannot be found at the expected location and may then search other locations. A process may also determine that a telephone line, network socket, memory, disk space, or other requested resource is unavailable, and try several times to obtain the resource before warning the user or failing.

However, errors other than input or missing resource errors may go undetected until important information is corrupted or lost. In particular, processes do not typically detect corruption of their own internal structure while they are running, and instead of reacting gracefully to such errors, most processes fail catastrophically. Some processes do use exception handlers to limit the impact of serious errors after they occur, but still fail to detect corruption before the corrupted structures are relied upon.

Most computer programs, whether capable of distributed processing or not, need to be updated from time to time. Depending on the program's architecture, updating can be time-consuming, error-prone, and/or inflexible. Many programs are provided to users as large self-contained pieces of code. Over time, these monolithic agglomerations of code have grown quite large for popular applications such as word processors and spreadsheets. Updating such a monolithic program often involves deleting all of the existing code, regardless of whether it is different in the new version, and installing the new version of the program. In some cases, object code "patches" are used instead, and the amount of code replaced is smaller, but patches are normally used only for localized changes to a program, not for fundamental or widespread changes.

Some programs are less monolithic, being split into a main routine such as an event handler loop and a collection of dynamically loaded components. An update may then involve merely replacing one or more relatively small components. Dividing functionality between components also has the advantage of allowing two or more different programs to use the same component. For instance, an email program and a word processor could use the same spell checking code. Once they are loaded, however, such components generally stay in memory until all programs using them have finished executing (and some persist even after that time). Thus, even when dynamically linked libraries are used, updates to a program's behavior can often be made only after the program finishes its current work and stops running.

Some specialized programs reduce the need for updates by "learning" while running. For instance, neural net programs may alter the relative numeric weights assigned to connections between nodes in a neural net, thereby altering the program's response to inputs of a certain kind. Likewise, so-called "genetic" algorithms use permutations and optimality measurements to adjust successive generations of a program, eventually producing a program that is better than the initial program at optimizing some specified condition.

But when the code for measuring genetic optimality or adjusting neuron weights needs to be changed, for instance, even programs that "learn" while they run are updated using conventional techniques. Thus, difficult programming may be needed to change the input types accepted by a neural network. Neural networks also do not readily perform computing system functions such as keeping track of time or other system resources.

Thus, it would be an advancement in the art to provide an improved system and method for distributed computing which allow processes to detect corruption of their own internal structures before relying on the corrupted structures during execution, and which allow processes to react gracefully to such errors.

It would also be an advancement in the art to provide a system and method for distributed computing which provide a processor allocation scheme that is more flexible and better tailored to the needs of individual processes than current schemes.

It would be an additional advancement in the art to provide a system and method for updating distributed computing processes in a way which is more powerful than using patches, more efficient than replacing entire monolithic programs, and more flexible than the limited behavior changes available through neural net and genetic programming "learning" methods.

It would be a further advancement if such a system and method could be implemented in a manner which is compatible with current networks and their protocols, and which takes advantage of suitable current programming language features and security methods.

An architecture for such a distributed computing system and method is disclosed and claimed below.

BRIEF SUMMARY OF THE INVENTION

One method for utilizing computer system resources according to a computing architecture of the present invention assumes that the computer system resources include at least two locations, with each location providing access to a processor for executing instructions and each location also providing a memory accessible to the processor for storing instructions.

The method begins by obtaining an operational environment for denizen processes. The operational environment includes at least the two locations and also includes a way for denizens to travel between the locations. The method then provides at least one user denizen which is capable of receiving instructions, evaluating different locations in the operational environment in view of the received instructions, selecting a location based on that evaluation, moving itself to the selected location, and executing at least a portion of the received instructions at the selected location.

One embodiment of the user denizen includes a configuration portion, an origin portion, and an executable portion. Among other contents, the configuration portion includes routing information; the origin portion includes an encrypted certificate; and the executable portion includes code and data. The user denizen is capable of reproducing at least one of these portions. The user denizen is also capable of reproducing and archiving itself, of detecting an error in itself, and of attempting to replace itself with an archived version of itself or attempting to rebuild itself from library components such as classes and templates which define denizen inheritance and extension information for the classes.

The user denizen is also capable of modifying itself, by dynamically loading and unloading code or creating and compiling custom code, in response to the result of executing one or more instructions. The modification may be accomplished using back propagation, dynamic recompilation, and novel evolutionary algorithms. The denizen can also handle exceptions internally to limit the impact of execution errors.

The operational environment includes administration denizens such as one capable of gathering information about different locations in the operational environment and providing that information to a user denizen; one capable of controlling access by user denizens to a particular location in the operational environment; one capable of tracking movement of denizens between locations in the operational environment; one that maintains a log of activities occurring in the operational environment; one that supports interactive management of denizens in the operational environment; an archive pod denizen for archiving and restoring denizens and accessing the library; and a connection pod denizen for tracking thread use and for gatekeeping between different operational environments, such as those owned by different entities.

In one embodiment, a computer system implementing an ecosystem computing architecture according to the invention includes an operational environment for denizens including at least two locations, each location providing access to a processor and memory; a transport means for denizens to travel between the locations; and at least one denizen which is capable of receiving instructions, evaluating different locations in the operational environment in view of the received instructions, selecting a location based on that evaluation, moving itself to the selected location, and executing at least a portion of the received instructions at the selected location.

The locations may be on different computers in a computer network. Some of the locations may provide access to a Java virtual machine or to a native Java operating system (possibly on a special chip) for executing denizens written partially or entirely in Java. The transport means may include a TCP/IP or other network connection for transfer between locations on separate machines; it may also include shared memory or memory copying routines for transfer between locations within a single machine. To avoid distributing viruses, to tailor denizen executable portions to specific locations, and to reduce bandwidth requirements, the transport means preferably includes means for specifying information for building a denizen by identifying code stored in a library at a destination location.

The invention provides an improved system and method for distributed computing which allows denizen processes to detect corruption of their own internal structures, by detecting checksum errors or catching exception conditions before they rely on the corrupted structures during execution. A denizen process reacts gracefully to such an error by containing the error's impact, by attempting to rebuild itself in order to proceed in spite of the error, and/or by archiving itself for later diagnosis when a rebuild is not possible.

In addition, denizens can use a processor allocation scheme that is more flexible and better tailored to the needs of individual processes than current schemes, because each denizen can individually decide where it should execute. The dynamic modification (possibly including on-the-fly loading and unloading of execution blocks) used by denizens for updating is more powerful than using patches, more efficient than replacing entire monolithic programs, and more flexible than the limited behavior changes available through conventional neural net and genetic programming methods.

Denizens can also be implemented in a manner which is compatible with current networks and their protocols, and which takes advantage of suitable current programming language features, such as Java exception handling, and also takes advantage of security methods such as encryption. Other features and advantages of the present invention will become more fully apparent through the following description

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to a distributed computing system architecture. The invention may be employed in computing systems, computing methods, and/or individual computing devices. The invention may be used with stand-alone computers, with computers connected by a network, or both. The computers may be workstations, desktop computers, laptop computers, mobile computers, servers, clients, peers, uniprocessor or multiprocessor machines, embedded systems, and/or other computers. Suitable networks include local area networks, metropolitan area networks, wide area networks, the Internet, or any combination thereof. "Internet" as used herein includes variations such as a private Internet, a secure Internet, a value-added network, a virtual private network, a portion of the Internet such as the World Wide Web, or an intranet.

Ecosystem Model for a Computing Architecture

Although computer science and biology have mainly been viewed as very different fields of endeavor, some biological systems and methods have proven useful as computational metaphors. Good metaphors are not mere oversimplifications or cosmetic attempts to lighten an otherwise dry discussion. Instead, they summarize important aspects of a technical system or process. Computer science is often a very detail-intensive field, and the use of a well-chosen metaphor can help inventors and others by organizing details and by suggesting new possibilities. Perhaps the most notable examples of good biological computing metaphors are genetic algorithms which use biological genetics as a model for "evolving" computer programs, and neural net algorithms, which use brain physiology as a model for "training" computers.

Figure 1:
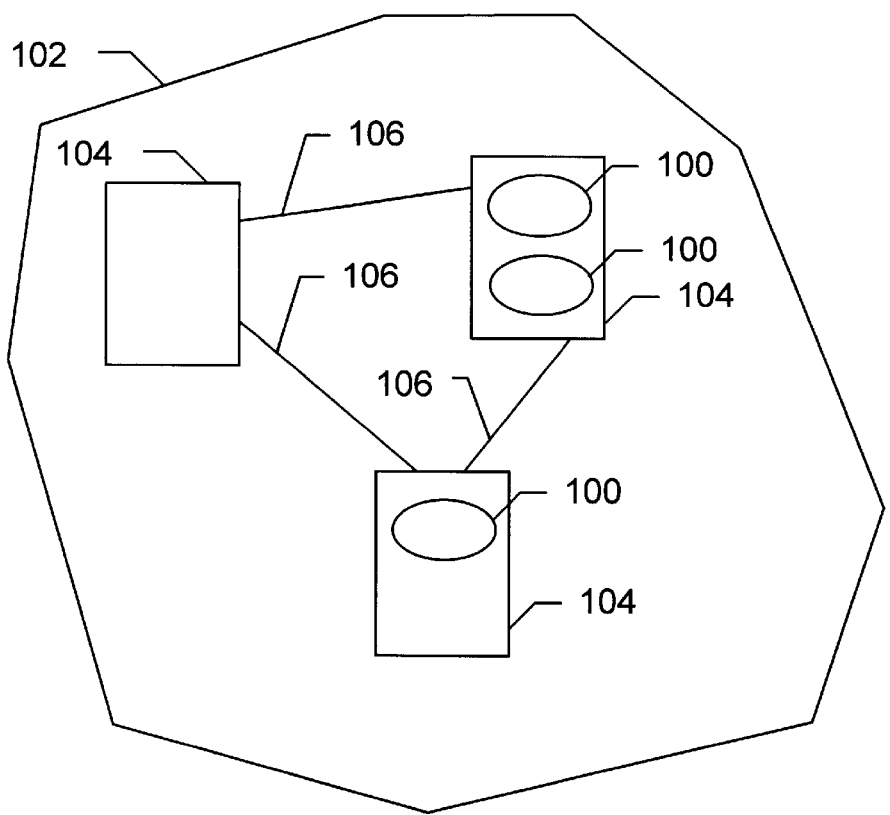
FIG. 1 is a diagram illustrating an operational environment, denizen processes, and other aspects of the present invention.

As illustrated in FIG. 1, the present invention uses marine ecology as a guiding metaphor for distributed computing.

Computing processes 100 are viewed as creatures inhabiting an ocean 102 of computing resources residing at various locations 104. A given machine in a network may contain one or more locations 104. An ocean 102 can reside on one machine or several. Likewise, all locations 104 can be viewed as belonging to a single operational environment 102, or they can be grouped into separate connectable oceans 102.

The "denizen" processes 100, also known as "Organic Data Elements" or "ODEs", have capabilities which are analogous to those of living organisms. For instance, denizens can move along paths 106 between locations 104 in the computational "ocean" that serves as their operational environment 102. The denizens 100 can also produce copies of themselves; they can detect damage to their internal structure and sometimes "heal" themselves by repairing the damage; and they can "learn" using neural net algorithms or other techniques. Each of these capabilities is discussed in detail.

Of course, the denizen processes 100 are not actually alive, and a computing system 102 is not literally an ocean of information and computing resources. Although the marine ecology metaphor is useful in understanding the technology of the present invention, the metaphor is only a metaphor, and so has inherent limits.

Denizen Structure

Figure 2:
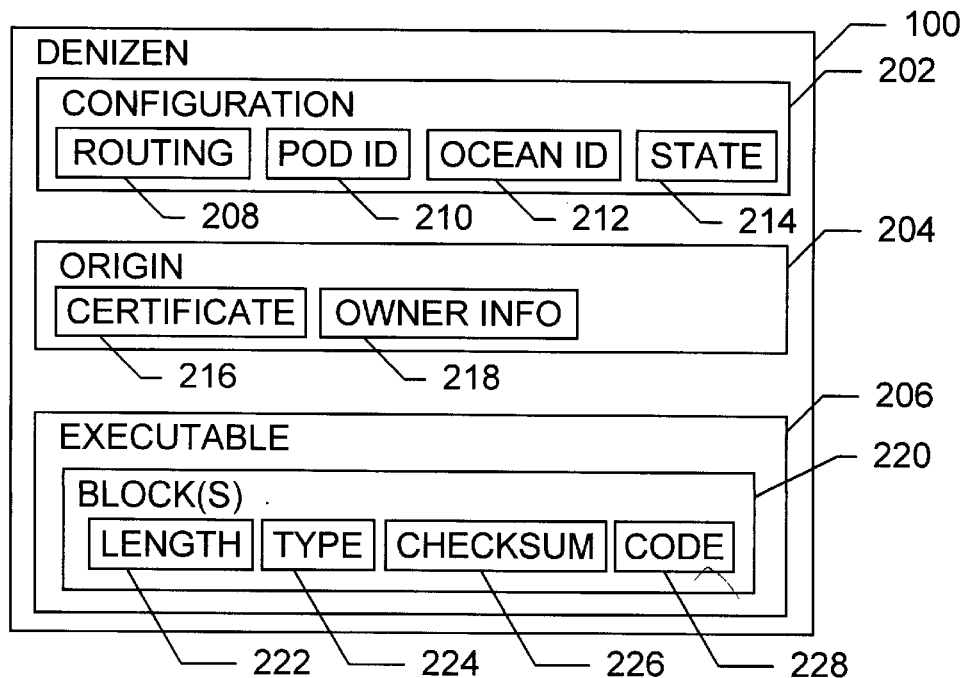
FIG. 2 is a diagram illustrating the internal structure of a denizen process in one embodiment of the present invention.

The internal structure of one embodiment of a denizen process 100 is illustrated in FIG. 2, with continued reference to FIG. 1. Each denizen 100 includes at least a configuration portion 202, an origin portion 204, and an executable portion 206. A section of the configuration portion 202 contains routing information 208 which reflects the paths 106 traveled by the denizen 100 to its current location 104 and/or known or possible paths 106 to other locations 104 in the operational environment 102. The configuration portion 202 may also contain a pod identifier 210 which identifies one or more "pods" to which the denizen 100 belongs; pods are discussed in detail below. In addition, the configuration portion 202 may contain an ocean identifier 212 which distinguishes the currently surrounding operational environment 102 from other operational environments. The configuration portion 202 may also contain execution state information 214, such as Java virtual machine flags.

Figure 8:
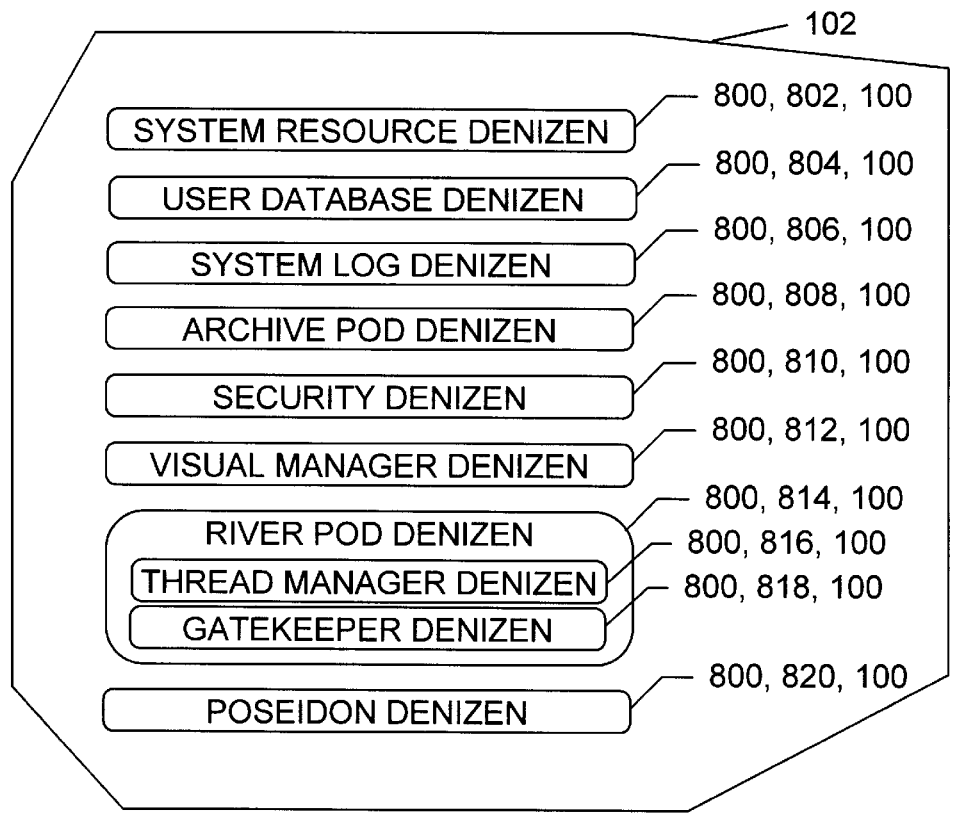
FIG. 8 is a diagram illustrating administrative denizens of the present invention.

The origin portion 204 includes an encrypted certificate 216 which can be presented before execution to an administrative denizen 810 (FIG. 8) that controls access to the operational environment 102 and otherwise enforces security constraints on "user" denizens 100. User denizens are denizens 100 initiated directly by particular users or directly on behalf of particular users, as opposed to administrative denizens 800 which primarily serve security, location tracking, resource tracking, and other internal administrative goals.

Information suitable for inclusion in the certificate 216 includes an author name, home ocean routing information, group information, checksums (such as cyclic redundancy codes) on the denizen's overall contents and/or on the portions 202 and 204, executable class information, and ODE type (administrative/user, security, and so on). The author name may be in a form similar to that in standard postal addresses, or it may be more complex, as with a login or user ID or an X.500 directory service distinguished name. Group information may likewise be text such as a department name, or it may be a group in the operating system or file system sense, as in the UNIX owner/group/world approach to permissions. Classes, which may be Java or C++ classes or subclasses, are discussed further below.

One method for using the certificate 216 is the following. The certificate 216 is registered with the security ODE 810. The certificate 216 of a first ODE is checked by or on behalf of a second ODE before the second ODE will perform a transaction for the first ODE. The certificate 216 of the second ODE may also be checked by or on behalf of the first ODE. Approved certificates are used to generate a transaction certificate which is unique for each transaction between ODEs. In addition to containing or otherwise identifying the approved certificate(s) on which it is based, the transaction certificate identifies the request or operation involved in the transaction. One of the underlying approved certificates may be used as a decryption key for the transaction certificate.

The transaction certificate serves as an agreement between the ODEs involved in the transaction. Only the information requested or the instructions issued for that transaction certificate can be executed during the transaction, making the transaction certificate similar in function to a conventional secured execution instruction. The results returned are not necessarily stored in the transaction certificate, but the return status of the request preferably is stored there. Each ODE, once it has "signed" the certificate to agree that the transaction is complete and the status recorded, considers the transaction completed. Each ODE stores (archives) the certificate or deletes it, based on the type of transaction and user/system settings. This archive can provide a roll-back capability for transaction processing.

The origin portion 204 of the ODE 100 may also include owner information 218 such as owner or author information, group identification, read/write/modify or other permissions, and other information which is similar or identical to the information that can be included in the certificate 216. However, the owner information 218 is not encrypted, so it can also be used to contain comments or information not needed for authentication.

The executable portion 206 includes zero or more blocks 220, also known as a data event paths 220. A default block 220 for receiving instructions, loading code, setting up exception handling, communicating with a Poseidon denizen 820, archiving, moving, and other basic denizen 100 functions is provided in a class or other code 228 that is present in most or all denizens 100. A control block may be placed in each block 220 (in the form of the fields 222, 224, 226 shown) or outside the blocks 220 but still within the executable portion 206 (not shown), or both.

Each block 220 control block includes a length field 222, a type field 224, and a checksum 226. Each block 220 also contains zero or more bytes of code 228. The length field 222 specifies the length of the block 220 in bytes or another convenient unit. Alternatively, the length of the first three fields 222, 224, 226 can be fixed and implicit, in which case the length field 222 specifies the length of the code 228.

The type field 224 specifies the type of code in the code field 228. Suitable types of code include machine-specific executable instructions and data, machine-independent instructions and data such as Java byte codes, markup language instructions and data such as HTML instructions and pixel files, database instructions and data, and other types of computer code. Code 228 may include classes such as C++ classes or other classes which organize or generate code fragments for an execution on a particular platform. In addition or instead, code 228 may include fragments of executable or interpretable (native or virtual machine) code. In an ODE library from which the code 228 and/or blocks 220 are obtained, class and subclass numbers refer to classes which organize code fragments to accomplish a specific function.

Within a subclass, there may be many code fragment references. These code fragments may be shared by all classes, or they may be unique to that class and subclass. If a user is editing a web page via an ODE 100, and adds an ActiveX control to the page, a code fragment with the ability to display ActiveX controls must be referenced or loaded by the ODE 100 which contains the data path 220 in which the web page is being stored. As long as the ODE 100 resides in an ocean 102 which contains that code fragment, only one copy of that fragment is necessary in the ocean 102. However, the fragment may become embedded in the data path 220 if the ODE 100 chooses to move to a new ocean 102 which does not contain that code fragment, or onto a machine which has no ocean 102. The fragment is preferably embedded as encrypted source code, and compiled on the destination machine as part of the ODE movement to that machine. The compiled or source code can also be added to a new ODE library on the new machine.

In one embodiment, each data event path 220 includes a 32-bit data path number, a 32-bit data path type number, and a control block. The following information is stored for each block 220 in the data path 220: an optional block name up to 16 characters long, a data type number which is 4 bits long, a 32-bit machine location identifier identifying the location 104 of the ODE 100, a starting address and an ending address for the code 228 (address length depends on the processor used but is generally 32 or 64 bits), the length 222 (again, system-dependent but generally 32 or 64 bits), the checksum 226, and the code 228 (variable length). The machine location identifier is given to each machine (or location 104) as it becomes a part of the ocean 102.

In one embodiment, every ODE 100 has its own interface which allows users to interact with the ODE 100 directly, subject to permission constraints. If there has been a system crash or error and only one ODE 100 remains functional, the owner or user of that ODE 100 can interact with the ODE 100 graphically (or non-graphically on a command line interpreter text-only system) to access system resources and repair the data ocean 102 and other ODEs.

ODE structures have several advantages. First, the ODE 100 can load the control block for a data event path 220, and using the information in the control block, load only the desired executable block(s) 220, without having to search memory for that information.

The memory or storage location information can be real (physical or logical) addresses if the ODE 100 is written in a language such as C or C++ that allows direct memory access, and can reference locations in languages such as Java that do not allow direct memory access. This combination allows the ODE 100 to load blocks 220 from storage on any machine in the system 102. This functions like shared memory in a SMP system, but without the additional programming required for SMP, MPP, or NUMA architecture memory access. The ODE 100 simply makes a request and the operating system on the machine retrieves the block of memory and gives the contents of the memory to the ODE 100.

Another advantage of this arrangement is that even though the ODE 100 can move from machine to machine, the contents of referenced blocks 220 do not have to move. If three blocks 220 in the same ODE 110 or in different ODEs reference a code fragment 228 or any other piece of information, instead of duplicating the information, each block 220 can reference the same memory locations, freeing the ODEs and thus the system 102 from storing redundant information.

A drawback of this approach is that shared memory writes must be coordinated with semaphores to prevent two ODEs from writing to the same memory location on the same machine at the same time. In place of semaphores, this may be solved by using ownership and access rights. Only one ODE 100 is allowed to own a given piece of memory or a given piece of data. Only the ODE 100 that owns that location in memory can modify the data contained there. Other ODEs that wish to access the data must request permission from the ODE 100 which owns the data. If the ODE 100 gives permission, it tells the requesting ODE 100 where the information is, and also stores a record of the ODEs which have permission to access that information. If the owning ODE 100 moves, and moves the data with it, or if the owning ODE chooses to move the data for any reason, (such as efficiency, archiving, or predicted system downtime) the owning ODE then informs all ODEs which access that data of the data's new location.

Other advantages of the novel ODE structure and associated methods include: dynamic code fragment access which reduces the size of tools and viewers by only including code 228 that is actually needed (as opposed to the approach taken by conventional monolithic feature-packed applications) and which allows non-sequential code loads; smaller databases (because less data irrelevant to a given task is loaded); dynamic index generation for database requests (discussed below); and less network bandwidth needed when transferring ODEs (as discussed in connection with libraries).

The novel architecture of the invention supports dynamic index generation. For instance, suppose a user needs to search a database which contains medical records for name, age, and weight. Using the control block, only the name, age, and weight blocks 220, or only those three columns in a normal database, would be loaded. This makes searches much faster, as well as requiring less RAM and CPU speed to access the same information.

Viewers and Tools

Applications and processes such as spreadsheets and word processors may be categorized as tools (permission to modify) or viewers (permission to read) of the data. Several different users of a given piece of data can view it simultaneously using as many different view methods as they wish. One viewer may see information using an ODE 100 with a spreadsheet viewer class, another may view the same information as a rendered graph with a graphing viewer, while a third may analyze the data and generate a 3D object representing the data with a scientific visualization tool.

All functions which modify data are performed using tools. All functions which can only view data are performed using viewers. Viewers and tools may be generated using the ODE library by managing ownership of the data that is being viewed and/or modified. For example, an ODE 100 which is directed to load a chunk of text owned by a different user—and therefore available only for viewing—would access the ODE library for the code fragments 228 necessary to view the text, but would not load or access code fragments needed to select, spell check, or in any other way modify the data. The owner of the text could load the text, and his or her ODE 100 would load the same code fragments as the first user for viewing, as well as loading spell-checking fragments 228, font-changing fragments 228, and so forth, as needed.

Each ODE 100 in this example would show in its task list all functions available to the ODE 100 for that piece of data. The user of the viewer ODE would see only two functions: End Access and Access New Data. By contrast, if there is a spell-checker in the ODE library for this ocean 102 and the owner of the data has permission to use the spell-checker ODE, then the data owner's ODE task list would include Spell Check Text, even if the spell-checker code 228 had not been loaded into the tool ODE yet.

If a user limited to view permissions reads a web page, that user's viewer ODE only has the ability to read and display the web page. By contrast, a user with tool (modify) permissions can modify the data from within almost the same interface. The ODE task list only contains tasks that can be performed on the information selected. If the user selects text that the user has permission to modify, the task list could display such tasks as Spell Check, Resize, Change Font, or Translate. If nothing is selected, then three sections appear in the task list: functions available in that tool or viewer; general ODE functions, such as spawn and add tool or viewer; and general system wide functions such as logout.

Denizen Mobility

As noted above, denizens 100 share certain capabilities with living creatures, at least by way of analogy. These capabilities will now be discussed in greater detail, beginning with mobility.

Figure 3:
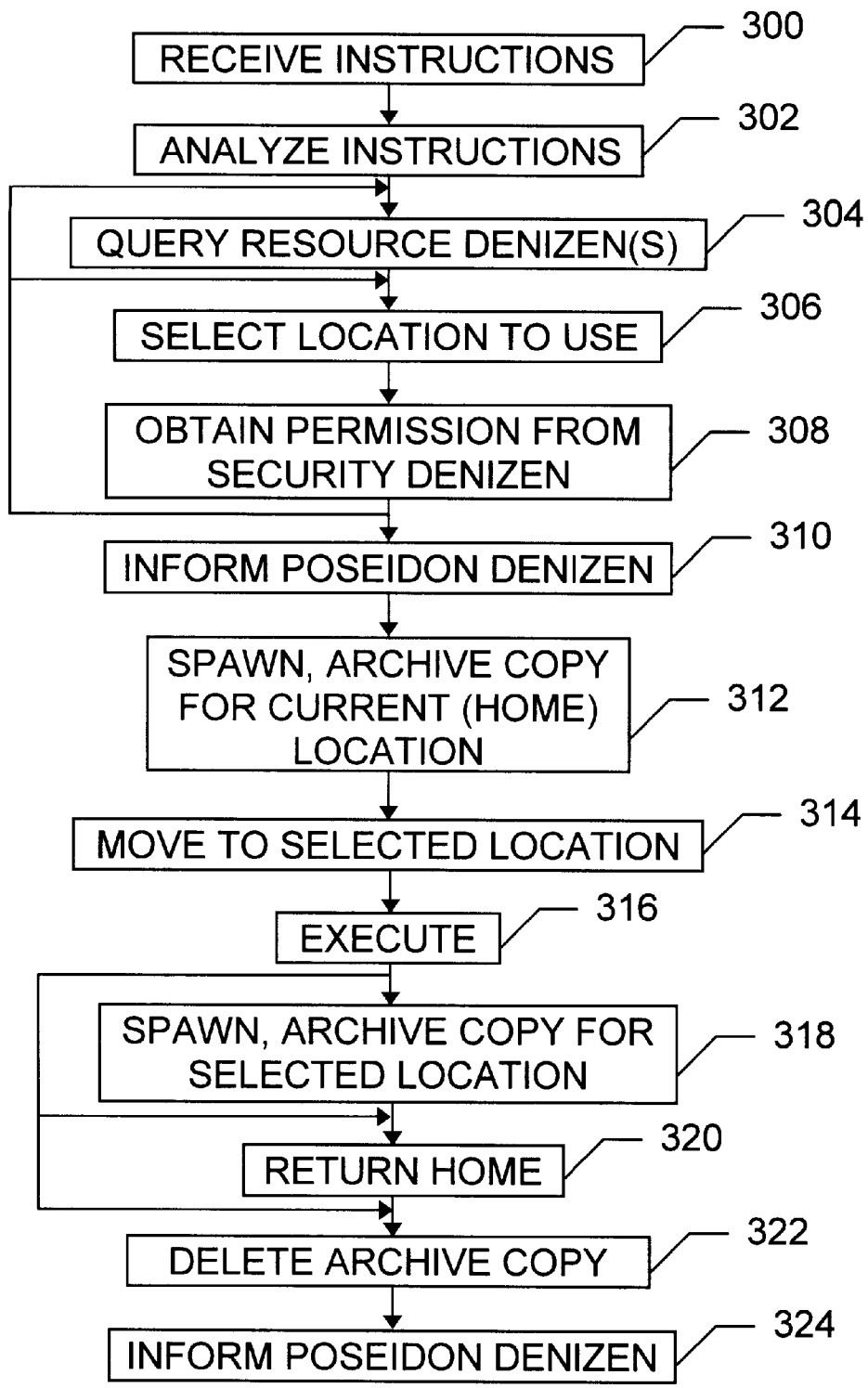
FIG. 3 is a flowchart illustrating a method by which denizen processes of the present invention select locations at which to execute received instructions.

As illustrated in FIG. 3, and with continued reference to the earlier Figures, each denizen 100 has the ability to receive instructions during a receiving step 300. Instructions may be in the form of commands or parameters supplied by a user interactively or by another denizen 100. Instructions may also be in the form of executable blocks 220 which are loaded by a denizen in response to such commands or parameters, or in response to information in the configuration portion 202.

During an analyzing step 302, the denizen 100 analyzes the received instructions by checking the type field 224 and priority (if any). During a querying step 304 the denizen 100 requests information about the resources presently available in the operational environment 102. This information may be maintained internally by the denizen 100 during its travels from location 104 to location 104. Resource information may also be provided by an administration denizen 802 (FIG. 8) which is tasked with tracking resource capabilities and availability.

Suitable resource information includes CPU type and speed, memory characteristics, hard drive availability, system histories, swap space, and other computing resource characteristics. If the resources needed to execute a given set of instructions are not available within the denizen's native ocean 102, then the querying step 304 may involve contacting resource denizens in other oceans in an attempt to locate the resources the denizen 100 needs.

During a selecting step 306, the denizen 100 selects a location 104 based on the results of the steps 302, 304. Information considered may include not only the resources at the current location but also a history of attempts made at various locations 104 and other information needed to determine which location 104 is best for executing the received instructions. Several locations 104 may be selected and ranked by preference in case the best location 104 is unavailable. It will be appreciated that as a result of this and other aspects of the novel architecture, denizens 100 are not limited to conventional uniform-for-all-processes and/or centralized load-balancing approaches, since different denizens 100 (or the "same" denizen 100 at different times) may use different load distribution algorithms, including chip-specific algorithms.

During an obtaining step 308, the denizen seeks permission from the appropriate security denizen 810 to move to the selected location 104, by supplying the certificate 216 to the security denizen 810. If permission is not forthcoming, the requesting denizen 100 may wait and retry, or it may try to get a user or administrator involved to override the security denizen 810 if appropriate. However, it is presently preferred that the requesting denizen 100 select and try a different location 104 without involving users and administrators unless progress on the computational problem assigned to the denizen 100 is seriously impaired.

Once permission is obtained, the denizen 100 informs the administrative Poseidon denizen 820 (FIG. 8) of the impending move during a step 310. The Poseidon denizen 820 acts as an interface between the operating systems of the various locations 104, on the one hand, and the ocean 102 and denizens 100, on the other. The denizen 100 then archives a spawned copy of itself during a step 312, moves to the new location during a step 314, and executes the received instructions at the new location during a step 316. Upon completion of its task, the denizen 100 archives a temporary spawned copy of itself at its temporary location during a step 318, and then returns home during a step 320.

During a step 322, the archived copy of the denizen 100 created by the step 318 is deleted. Alternatively, the denizen may make the new location its new home, in which case step 318, or steps 318 and 320, are skipped and the archived copy created during the step 312 is deleted during step 322. In either case, the Poseidon denizen 820 is informed of the denizen's location after execution of the received instructions.

It is presently preferred that ODEs be specified during transfers (between locations and/or libraries and/or archives) in most cases as a tuple containing numbers or other short identifiers which identify classes, templates, versions, and/or specific executable blocks 220. The actual executable code and other data needed to build an ODE may be located in an ODE library which is either stored centrally or stored at multiple locations 104. In one embodiment, ODEs are primarily written in Java and the ODE library includes classes which organize or generate code in Java, C++, or other programming languages.

When an ODE 100 spawns a new ODE 100 on the same machine in the ocean 102, the spawn subclass is preferably loaded or referenced from an ODE functions class, which is archived in the ODE's JAR (Java archive) file or other archive file. If the class is damaged, or if the ODE 100 is spawning the new ODE 100 on a different computer in the ocean 102, then the same subclass is loaded from the same class file, but is from the ODE library of the destination machine. This ensures that the new ODE 100 is written in code native to the destination platform, and that the version number of the spawned ODE 100 is the same as the version number of the code fragments loaded on the destination system.

When an ODE 100 moves across a network communication line, or moves into an archive, the minimum amount of data needed to reconstruct the ODE can therefore be transmitted or archived. This includes the tuple and any metadata or state information not reflected in the tuple.

In one embodiment, when an ODE 110 moves, it actually transmits ODE library class and subclass information, other template information such as inheritance and extension information, the ownership certificate 216, and data which is being referenced. In place of some or all of the data, the ODE 100 may send references in the block 220 to the data's location, in situations where the user does not own the referenced data or does not wish to move (a copy of) the data. On the destination machine, a new ODE 100 is created based on the library information, and the data is transferred into that ODE 100.

Another advantage of this method is that it allows the new ODE 100 to be created in the native code of the platform 104 to which it is being moved. This platform at the new location 104 may be different from the platform at the prior location 104. Suitable platforms include, without limitation, Java Virtual Machines and other virtual machines, as well as native code systems. In the case of a transfer from a virtual machine platform to a native code platform, the Poseidon denizen 820 will build the new ODE with native code. Code fragments 228 within the data event path 220 are also preferably transmitted by library number only, and the native code fragments 228 on the destination machine are substituted. The new ODE 100 is compiled dynamically as needed and then goes about its business on the new machine. When new ODE libraries are licensed, and when upgrades are downloaded, they are preferably received as encrypted source instruction sets (encrypted source code), which Poseidon then compiles for each platform in the ocean 102.

Yet another advantage to this method of movement is that executable code need not be transferred across the network. In addition to reducing bandwidth requirements, this prevents viruses from being transferred as ODEs move between locations 104, if the embodiment uses a separate copy of the library at each location 104.

Denizen Reproduction

Figure 4:
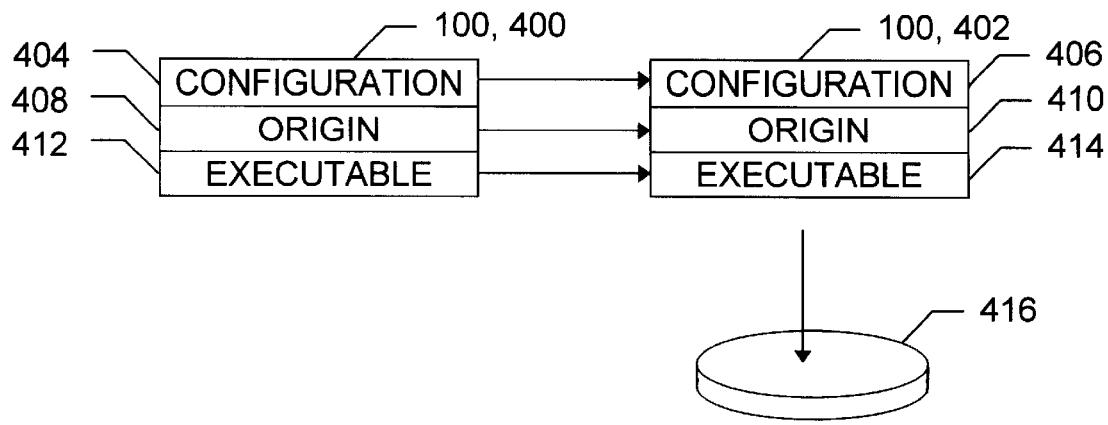
FIG. 4 is a diagram illustrating the spawning of a fully identical version of a denizen process according to the invention.
Figure 5:
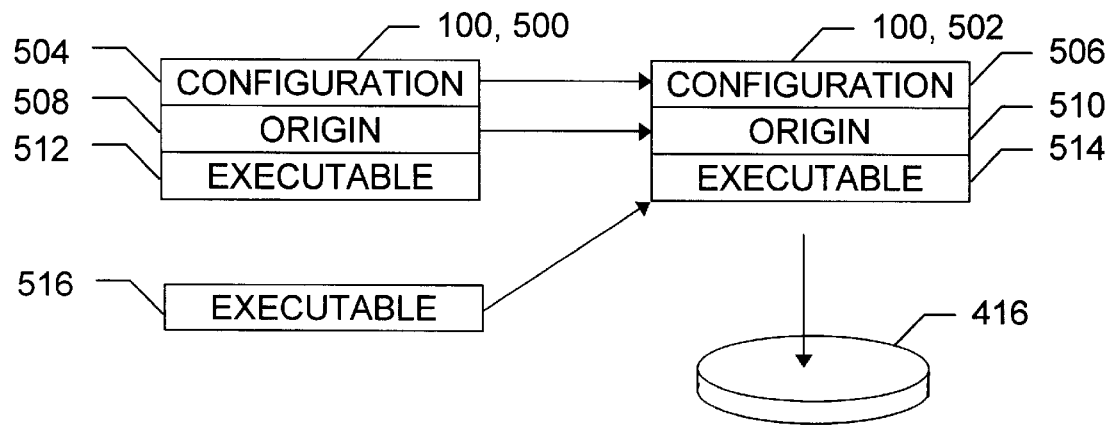
FIG. 5 is a diagram illustrating the spawning of a partially identical version of a denizen process according to the invention.

Each denizen 100 has the ability to reproduce, as illustrated in FIGS. 4 and 5 and with continued reference to the earlier Figures. FIG. 4 illustrates the case in which a denizen 400 spawns a fully identical copy 402 of itself, while FIG. 5 illustrates a denizen 500 which spawns a partially identical copy 502 of itself. The fully identical copy 402 is spawned by creating a complete copy of the original denizen 400 in memory and then informing the Poseidon denizen 820. Thus, the configuration portions 404, 406, origin portions 408, 410, and executable portions 412, 414 of the denizens 400, 402, respectively, are identical in content, although they reside at different locations in memory. The spawned denizen 402 may continue to reside in memory, or it may be archived on a non-volatile buffer such as a hard disk 416.

The partially identical copy 502 is spawned by creating a partial copy of the original denizen 500 in memory, optionally combining the partial copy with a portion obtained from a source different from the original denizen 500, and then informing the Poseidon denizen 820. Instead of creating the partial copy, a complete copy of the denizen 500 could be created and then be truncated or overwritten. The spawned denizen 502 may continue to reside in memory, or it may be archived on the non-volatile buffer 416.

In the example shown, the configuration portions 504, 506, and the origin portions 508, 510, of the denizens 500, 502, respectively, reside at different locations in memory but are identical in content. The executable portions 512, 514 of the denizens 500, 502, respectively, contain different content. The executable portion 514 of the spawned denizen 502 is derived from a library or other source 516, not merely copied from the original denizen 500. In another spawning situation, the configuration portion 506 and/or the origin portion 510 could also differ from those of the original denizen 500. The executable portion 514 could also be a subset of the executable portion 512, or a combination of one or more blocks from the executable portion 512 with one or more blocks from the source 516.

Denizen Learning (Overview)

With reference to all Figures, denizens 100 may use a back propagation scheme which is somewhat similar to the scheme used in neural networks. The learning methods are discussed in detail elsewhere, particularly in connection with FIGS. 9 through 11. It suffices to note here that denizens 100 can modify their execution code or data 228 based on the success or failure of an attempted execution during the executing step 316. In place of modifying its own executable portions 206, or in addition to such modification, a denizen 100 can also spawn partially identical offspring 502 according to a genetic algorithm or other evolutionary algorithm.

Denizen Healing

Figure 6:
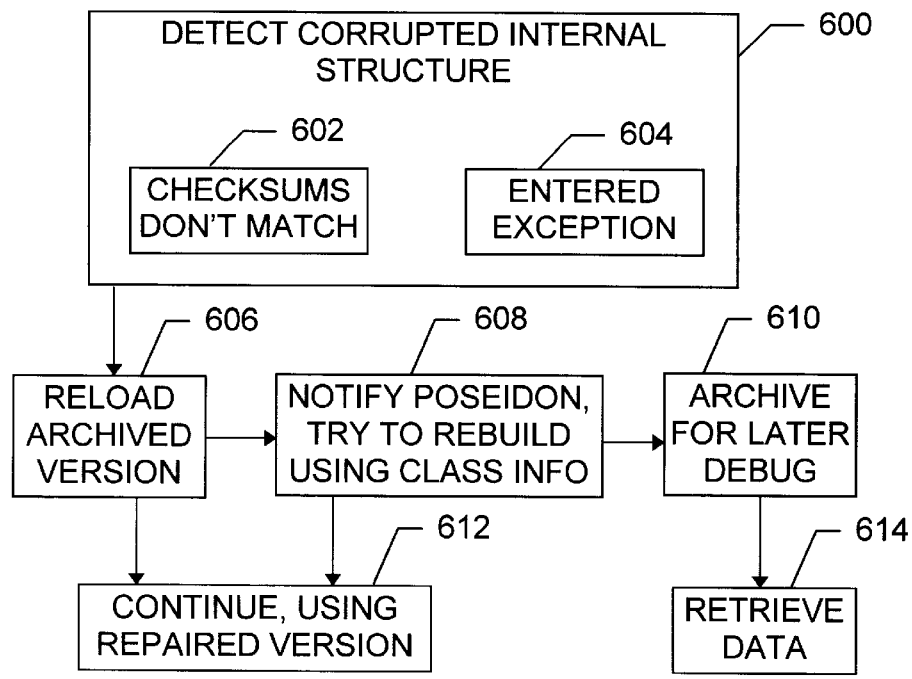
FIG. 6 is a flowchart illustrating a method by which denizen processes of the present invention attempt to detect and repair defects in their own internal structure.

If a denizen 100 becomes corrupted but still has at least a limited ability to execute, then the denizen 100 preferably tries to repair itself using the method shown in FIG. 6. The denizen 100 detects corruption of its internal structures during a step 600 either by noting a checksum error during a step 602 or by entering an exception condition during a step 604.

The checksum error may be detected when the denizen 100 begins execution and/or after the denizen 100 changes locations 104 during the step 314. The denizen 100 is corrupted if the checksum value in the certificate 216 does not match a checksum value on the corresponding portions 202, 204 (or on the entire denizen 100, as appropriate) which is calculated after moving or beginning execution. The checksum error may also be detected during spawning or self-modification when the denizen 502 loads a block 220 or block container 908 (FIG. 9), by comparing the checksum value in the block's checksum field 226 or in the block container with a checksum value calculated on the code 228 after the block 220 or container 908 is loaded into memory.

Depending on the kind of checksum used, and the nature of the corruption, checksums alone will not necessarily detect the corruption. Thus, the denizen 100 preferably also detects exception conditions. Exception conditions may be caused by programming errors that are difficult or impossible for the denizen 100 to repair or avoid. However, hardware or transmission errors may also cause exceptions by corrupting data or code in a block 220. Exception conditions detected preferably include any attempt to divide by zero, to access memory outside the denizen's memory space, to execute an undefined instruction, to access an out-of-bounds array element, or to perform another illegal operation.

The Java language features inherent exception handling. Software according to the invention may use this feature for exception handling for a given piece of code 228. In addition, or as an alternative, the software may use custom exception handling for an entire ODE 100. In the latter case, the ODE 100 executes in a protected memory space. These exception handling capabilities help prevent an ODE execution error from causing a system failure if the host operating system is not fault tolerant (such as with certain Microsoft Windows 95/NT, MacOS, and OS/2 operating systems). If an exception is thrown, the ODE 100 attempts to send an exception number to its pod 700 and then "dies"; self-repair and diagnostic methods discussed herein may then proceed.

After detecting a problem with its internal structure during the step 600, the denizen 100 tries to repair itself During a step 606, the denizen 100 first tries to reload the most recently archived version of itself. If this is not possible, it informs the Poseidon denizen 820 of its situation and then tries to rebuild itself based on its class, subclass, and checksum information during a step 608. The rebuild may be accomplished by obtaining copies of the blocks 220 defined in the (uncorrupted or restored) control block of the denizen 100 and reloading them into memory. The blocks 220 are preferably obtained from a local ODE library managed by the archive denizen 808, but may be transported from other locations 104 if necessary. The blocks 220 are modified as indicated by the denizen's templates to reflect the desired class inheritance and extension status.

If either of the steps 606, 608 produce an uncorrupted version of the denizen 100, then execution continues during a step 612. Otherwise, the denizen 100 informs the Poseidon denizen 820 of the failure to heal and archives itself in its current state during a step 610. A user or an administrator may be able to rebuild the denizen 100 later, or may at least identify ways to prevent similar problems with other denizens. The denizen's remains can be analyzed, and any remaining data can be retrieved, during a step 614.

Pods

Figure 7:
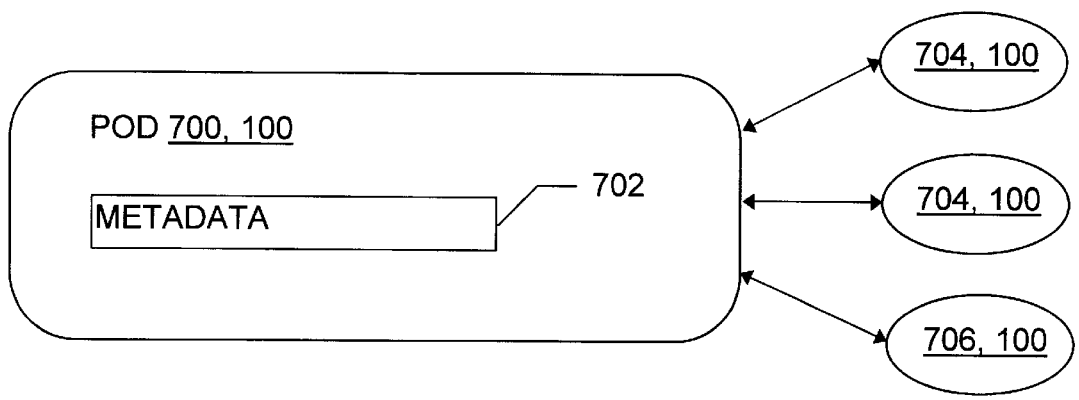
FIG. 7 is a diagram illustrating a family denizen of the present invention, a pod denizen belonging to the family denizen, and two simple denizens belonging to the pod denizen.

As shown in FIG. 7, a given pod 700 may play dual roles as an executable denizen 100 and as an organizational structure for child denizens 100. Each pod 700 maintains location references and other metadata 702 for its child denizens 704. Just as the denizens 704 are grouped by the pod 700, the pod 700 and other pods may be grouped by a family denizen 706. Metadata 702 may include information such as which spawned child 704 received which portion of a database when spawning occurs to distribute a database to promote efficiency or satisfy memory limitations. Metadata 702 may also track the history of data references, in order to avoid attempts to access data which has been moved, or to recover from such attempts by contacting the owner of the data to determine the data's new location.

In one embodiment, a denizen 704 informs its parent pod 700 when it moves. If the denizen 704 moves outside of its home ocean 102, its parent pod 700 informs its family 706, and the family 706 informs the Poseidon denizen 820, as discussed above in connection with denizen mobility and step 310. In other embodiments, different hierarchical or linked denizen organizational structures are used, such as by omitting the family layer in the hierarchy or by using a ring instead of a tree hierarchy. In some embodiments, different communication paths are used, such as when a denizen reports its move directly to Poseidon 820.

All denizens 704 belonging to the pod 700 are preferably related by function, owner, or data content. When a denizen 100 spawns a child denizen, the parent denizen becomes a pod 700 if it is not already one. The new pod's structure is similar, but the pod denizen 700 incorporates database blocks 220 and/or metadata needed to store information on its child denizens 704. The parent denizen 700 may delegate its execution functions to one or more child denizens 704 by transferring the execution blocks 220 in question to each child 704.

Administration Denizens

As noted above and illustrated in FIG. 8, the operational environment 102 includes various administration denizens 800. Alternative embodiments omit some or all of the denizens 800 by omitting their functionality from the system, by combining some or all of the functions in fewer denizens 800, by assigning responsibility for the administrative functions to what would otherwise be user denizens 100, or by a combination of these measures.

Some embodiments include multiple instances of some or all administrative denizens 800. For instance, database, logging, and archiving functions may use a single database which is distributed and managed by several closely coupled denizens 800, or they may use separate databases managed by loosely coupled denizens 800. Likewise, security constraints may be enforced by a single central denizen 810, by several roving denizens 810, or by one denizen 810 at each location 104.

The illustrated embodiment includes a system resource denizen 802 which gathers information on the performance and resources available at a specified set of one or more locations 104. Suitable resource and performance information includes some or all of the following:

| | |
|---|---|
| CPU | speed |
| | % available |
| hard drives | total space |
| | available space |
| | file system type |
| | access time |
| RAM | total |
| | available |
| system cache | total L1 |
| | total L2 |
| NICs | speed |
| | protocols |
| | address |
| modems | dial out speed |
| | authentication method |
| backup devices | device type |
| | scheduling information |

A user database denizen 804 contains and manages a users/groups database for the ocean 102. This database may include login time restraints for each account or group, user login paths, file and directory permissions, billing information for pay per use or per time accounts, and similar accounting data. The Poseidon denizen 820 can configure this database as needed. This database ODE 804 contains its own query processing code. As with all ODEs, this ODE may remain a simple ODE 100 but it can also become a pod 700 and spawn other ODEs if it becomes too large to function efficiently.

A system log ODE 806 contains process logs, such as transaction logs, for this ocean 102. In one embodiment, the logs are kept in a database and the denizen 806 includes query processing code 220. The ocean administrator 820 can preferably configure the denizen 806 to track specified processes using a simple graphical user interface (GUI). The administrator 820 can also configure the size of a log file. When the system log ODE 806 is functioning with its default configuration, the ODE 806 closes and archives the log file whenever the file reaches its maximum file length, and then creates a new log file. The ODE 806 may also contain blocks 220 for viewing the log file and/or generating reports.

One embodiment uses no files, though users can import them from other systems. Instead, the "log file" is actually a data event path 206, or many data event paths, depending on the configuration. When the ODE 806 grows too large it spawns a new ODE, and either copies the log into the data event path 206 of the new ODE, which is then archived, or creates a new ODE with a data event path 206 ready to receive additional log information and then archives itself.

An archive pod 808 allows Poseidon 820 to define an archive date for ODEs 100 within the ocean 102. For example, a system administrator of an Internet service provider can set an archive date on user account ODEs 100. If the archive date is one week, and a person with an active account has not logged on for eight days, then that person's ODE 100 will "sleep" and be archived by the archive denizen 808 in a USER_ACCOUNTS.ark or similar file. This archive file is preferably a compressed database ODE 100 which stores the archived ODEs intact. The next time the account owner tries to log on, the system will not find his or her account. It will then query the archive pod 808, which will pass the query to the USER_ACCOUNTS ODE. It will reply that the ODE for that account is archived and, if the account is still valid, the ODE will be restored from the archive and returned to active status. The account owner may notice a slightly longer log on time, but will notice no other behavioral changes in his or her account for that session.

The Poseidon denizen 820 can also set a progressive die date. ODEs 100 will be deleted from the ocean 102 after the die date has passed if the ODEs 100 also meet other criteria. As an example, assume people fill out an entry form on a web page for an online sweepstakes. The entry form contents are stored in a database ODE 100. After the contest is over, the contestant data would be transferred to a marketing family 706, and the ODE 100 for entering the sweepstakes would be deleted.

The archive pod 808 preferably defaults to an active archive approach. This means that all ODEs resident on a host at a given location 104 will be archived on a different host in the ocean 102 or on a specified backup device when the first host's mean activity falls below a given limit, or after a given amount of time has passed since its last archive. Archives can be done with the ODE 100 active by using a spawning technique, or with the ODE 100 inactive by using a direct archive technique. These approaches are preferably administered through the Poseidon denizen 820. If the ocean 102 resides entirely on a single machine, a Zip or Jazz Drive or a tape back up system is preferably used by the archive ODE 808 to routinely back up the ocean 102; similar measures should be taken on multi-machine oceans 102.

As noted earlier, the security ODE 810 checks certificates 216 of user or guest ODEs 100 before they are allowed to execute on a given host or at a given location 104, and otherwise enforces security constraints.

A VisualManager ODE 812 supports interactive management of denizens 100 in the ocean 102. The VisualManager ODE 812 creates a panel on the computer screen which can be maximized or minimized by the user. This panel displays icons representing ODEs 100 which are currently active in the system (either limited to the location 104 or for the entire ocean 102). The Poseidon denizen's panel includes administrative ODEs 800 and non-administrative user ODEs 100. Each ODE type is displayed in an environment icon which, when clicked, expands to include a query box and a scroll box with categories based on the origin portion 204. The ODEs within the categories are listed by name. The query box allows an administrator or user to search for active ODEs using a plain text search.

The user panels display only the ODEs which users have a right to access based on their permissions level. Some ODE categories are available to all users, including: one which shows the owner name for all users logged onto the system who have given that user permission to see them (the administrator's panel displays the identity of all users); one which lets the user search for log files on ODEs on that system; and one which lets users search for non-active ODEs on the system.

A river pod denizen 814 manages connections with other oceans 102, such as connections seeking resources across ocean boundaries. Such extra-ocean connections may be made by an ODE 100 within the given ocean 102, or by a user logged on to a machine in the ocean 102 who uses an ODE 100 to initiate the connection. The river ODE 814 also manages connections to non-native ODE applications running on machines in the ocean 102. This may include database management systems, legacy systems, hardware drivers, Java virtual machines, network computers running non-ODE environments, UNIX/VMS shell scripts, foreign executables, and any unknown data stream.

When data is being transmitted between two ODEs across a network connection, the communicated packets (such as TCP/IP packets) are encrypted using the certificates 216 of the two ODEs, the certificate 216 of the river ODE 814 that is managing the transaction, the source network (IP) address, the destination network (IP) address, and the transaction certificate for the transaction. This prevents unauthorized access to the contents even if the communication is intercepted, because only the ODE which owns the certificates can decrypt the transmission packets, and only at the specified destination address, and even then only for the particular transaction involved. Of course, the network does not have to rely on or even use TCP/IP. Software according to the invention may support multiple network protocols, and may be expanded to include future network protocols.

In one embodiment, the river pod denizen 814 is parent to a thread manager ODE 816. All ODEs can spawn and manage threads. But when an ODE 100 does so, it registers the thread with the thread manager ODE 816. The thread manager ODE 816 analyses system resources and allows threads to be spawned on a priority and permissions basis.

For instance, if an ODE 100 creates a socket connection with another application across a network, that socket is managed as a thread. Each thread takes up memory and (in this case) network bandwidth. If someone with very high priority has scheduled a video multicast, they need most of the network bandwidth available to the system 102. Other ODEs may not be aware of this scheduled event. If an ODE 100 sees that there is network bandwidth available for its socket connection, it will ask the thread Manager ODE 816 to allow it to spawn the thread. The thread manager ODE 816, knowing that the video multicast is the highest priority for the allocation of that network resource, will not allow the socket thread to be spawned through that network connection. However, the thread manager ODE 816 will direct the requesting ODE 100 to use another network connection if one is available.

In one embodiment, the river pod denizen 814 is also parent to a gatekeeper ODE 818. The gatekeeper 818 has two main functions. The first is security; the gatekeeper 818 provides the capabilities of standard firewall systems such as IP masking, IP filtering, and user authentication. The second main duty of the gatekeeper 818 is to manage network configuration. Generally, this means tracking how the network resources of the ocean 102 are configured. But the gatekeeper 818 may also provide a wide variety of dial-in users with the configuration information needed to dial in and log on normally, as in the traveling executive example elsewhere in this document.

Denizen Learning (In Depth)

Conventional genetic algorithms and adaptive neural networks can only adapt themselves based on a predetermined set of rules. They do not respond well if their inputs are modified or the input data changes during runtime. They are written to accomplish a single predetermined task. Finally, they cannot be dynamically created and modified in response to unexpected input or system events.

Figure 9:
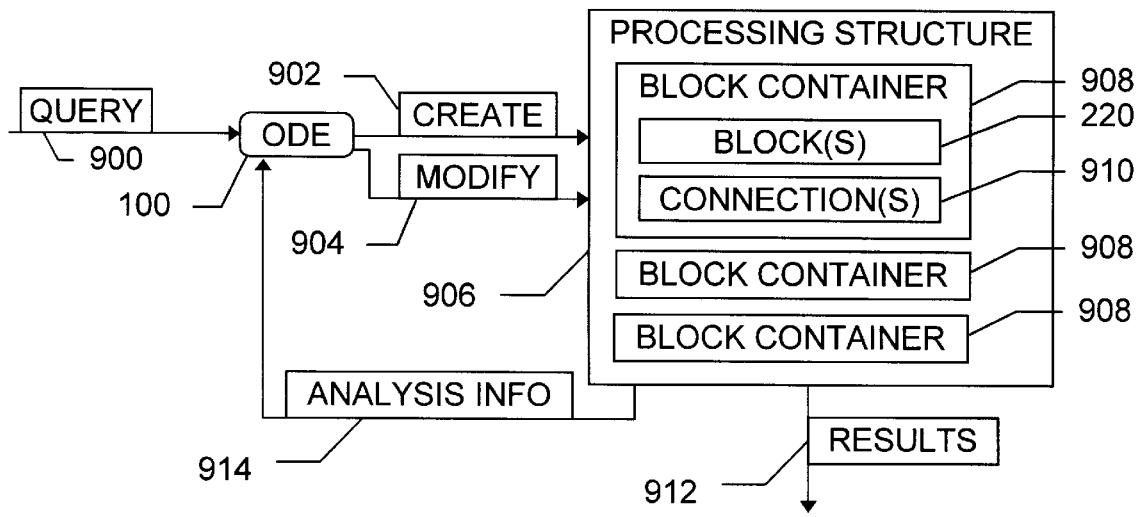
FIG. 9 is a diagram illustrating the creation and dynamic modification of a denizen processing structure according to the invention.

Although the process by which an ODE 100 "learns" is somewhat similar to that in conventional evolutionary computing systems, there are fundamental differences. As shown in FIG. 9, the ODE 100 analyzes the inputs requested in a user's query 900 and takes steps 902 to generate (or steps 904 to modify) a suitable processing structure 906. The processing structure 906 includes one or more block containers 908. In one embodiment, the entire processing structure resides within an ODE 100; in an alternative embodiment each block container 908 is a separate (loosely coupled) ODE 100.

The block containers 908 either are or contain executable blocks 220, which in turn hold code fragments 228. Each fragment 228 has a given input type, a processing method, and connections to other processing fragments 228. The fragments cooperate to produce results 912 which are transmitted to the user and/or to the ODE 100 for handling. Because the structure 906 can be a series of related code fragments 228 in a single data event path 220 or an organization of ODEs 100 with each ODE containing code 228, work on processing the query 100 can be divided throughout part or all of the ocean 102.

The processing structure 906 is generated and configured on the fly, based on a set of rules and templates found in an ODE library or on other criteria. Thus, the learning method used by ODEs could be viewed as a novel form of evolutionary algorithm. Based on analytic information 914 such as intermediate results, error messages, resource requests, and user responses, the ODE 100 analyses the capacity of the structure 906 to successfully respond to the user's query 900. During the step 904, the ODE 100 can load, unload, and/or recompile the blocks 220 of the processing structure 906.

This allows the ODE 100 to make fundamental changes in behavior during runtime, without losing what the structure 906 and the ODE 100 have already learned about the problem and its possible solutions. For instance, if the user changes the query 900 during runtime, the existing matches based on the first version of the structure 906 may be kept and compared against results in the new version of the structure 906 to assess relevancy.

Unlike neural networks, genetic algorithms, and other conventional evolutionary algorithms, the method of the present invention allows an ODE 100 to compile the "network" of processing fragments 228 on the fly, with no user intervention. The code 228 being used can be modified to make the structure 906 more effective during runtime, in response to the degree of success of the current and past versions of the structure 906. ODE code fragments 228 in a data event path 220 can access databases or other data repositories as a step in the data input evaluation process. The "weight" of a "connection" between ODEs or between code fragments 228 could be simply a number, but it could also be a connection to a different database or data resource. To the inventor's knowledge, nodes or connections of conventional neural nets cannot access databases as a part of their process, and conventional genetic algorithms must be "hardwired" to access a given database.

The learning method used by an ODE 100 is preferably tightly coupled to the method by which the ODE 100 retrieves information from databases, files, and other processes. If data inputs or databases move, even during a search, the processing structure 906 preferably can continue to access them as if they had not moved. If the structure of a database changes in the middle of processing a request 900, the ODE 100 can load appropriate blocks 220 and/or containers 908 and continue processing the request by gathering information from the new database structures. If inputs need to be added to the blocks 220 or if the interconnections 910 need to be added or changed, then the processing structure 906 can be recompiled and rebuilt on the fly without abandoning processing of the request 900. Such adaptation may also be needed as a result of additional user requests 900 or as a result of unexpected events such as an exception being thrown or an error being encountered in the database structure.

Denizen Learning Examples

The denizen learning method and architecture may be used as part of a novel search engine. Suppose the user enters the four search terms "dog," "collie," and "brown," and "black," and the structure 906 initially returns information on data paths or web pages containing information on collies which are brown and black. If the user adds the connector "or" between "brown" and "black", then the initial results are kept and a new request is generated for collies that are brown or collies that are black. The code fragment linkages 910 in the structure 906 would change on the fly. The pages that were retrieved for brown and black collies are kept, because brown and black collies would be found twice—once by the "brown" comparison, and once by the "black" comparison. If the search were modified again to say "brown" but not "black", then the databases which were searched before do not need to be searched. The structure 906 discards the information for the collies that are black and for the ones that are brown and black. In short, the structure of the request 900 can change, but the results of previous searches with similar request structures, and whatever was learned from the search, can still be used.

The denizen learning method and architecture may also be used as part of a novel translation engine. Assume an ODE 100 receives the following text in binary format to be translated:
01001000011000010111001000100000110100001100-
0101101110001000000110100001100001011001101-
0000100000011001100110010101110010011010010110-
0100111111

The ODE 100 assumes that the text chunk is in ASCII format, and displays it to the user as the following new message: "Har han haft ferie?" The user, who speaks only English, does not recognize the phrase or the language that the phrase is in. The user selects the message and presses the "Translate" button.

In response to receiving the instruction to translate this message, the ODE 100 spawns a child ODE 100 to translate the expression. The child ODE 100 is created using a database class and a phrase identification subclass. In order to create a data event path 220 based on the phrase identification subclass, the ODE 100 needs to identify the number of words in the phrase.

In order to identify the number of words in the phrase, the ODE 100 uses a tokenizer method to split the phrase into its component parts, in order. To do this, the ODE 100 searches the binary representation of the ASCII characters in the phrase, as listed below, for repeating non-character values. The following are the binary values of the decimal representations of each character from the standard ASCII character map, in 8 bit chunks with decimal equivalents:

| | |
|---|---|
| 01001000 | 72 |
| 01100001 | 97 |
| 01110010 | 114 |
| 00100000 | 32 |
| 01101000 | 104 |
| 01100001 | 97 |
| 01101110 | 110 |
| 00100000 | 32 |
| 01101000 | 104 |
| 01100001 | 97 |
| 01100110 | 102 |
| 01110100 | 116 |
| 00100000 | 32 |
| 01100110 | 102 |
| 01100101 | 101 |
| 01110010 | 114 |
| 01101001 | 105 |
| 01100101 | 101 |
| 00111111 | 63 |

The ODE 100 sees two non-character ASCII values, 00100000 (32) which is a space, and 00111111 (63) which is a question mark. The space is repeated three times, and so is probably a separator between words. Based on this information, the ODE 100 makes several assumptions: the text is a phrase or a sentence fragment; there are four words in the phrase, namely "Har", "han", "haft", and "ferie"; and the phrase is a question.

The ODE 100 then creates four new data event paths 220 identified as input values. These are analogous to the nodes in the input layer in a neural net. The binary values for these four words are copied into the four input blocks, as shown below. For ease of discussion, the pipe character | is used in this example to separate blocks, and the ASCII character is used from this point on instead of the binary value for each character. This diagram does not include the data event path control block:

|Har|han|haft|ferie|

Figure 10:
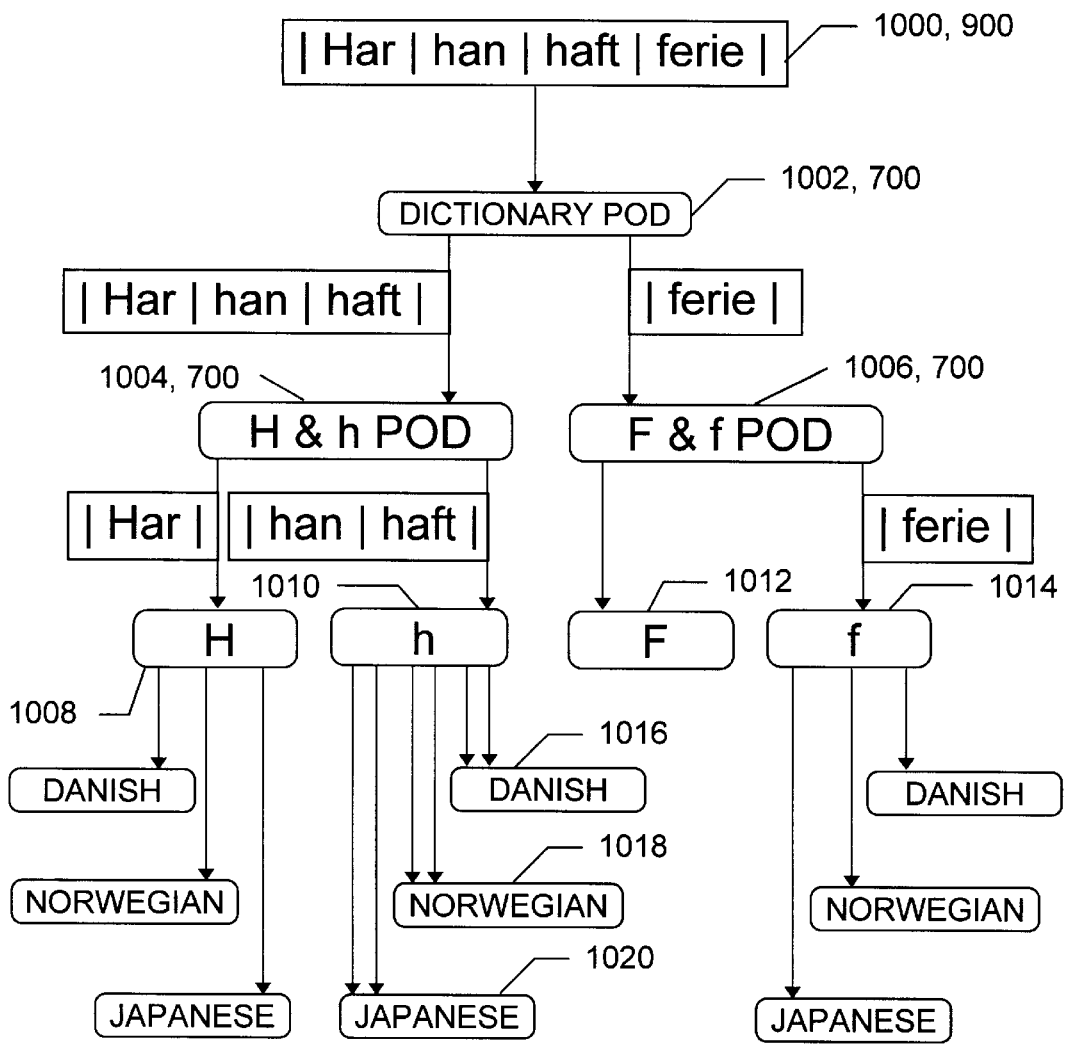
FIG. 10 is a diagram illustrating a denizen processing structure of the kind shown in FIG. 9, as initially configured to perform natural language translation.
Figure 11:
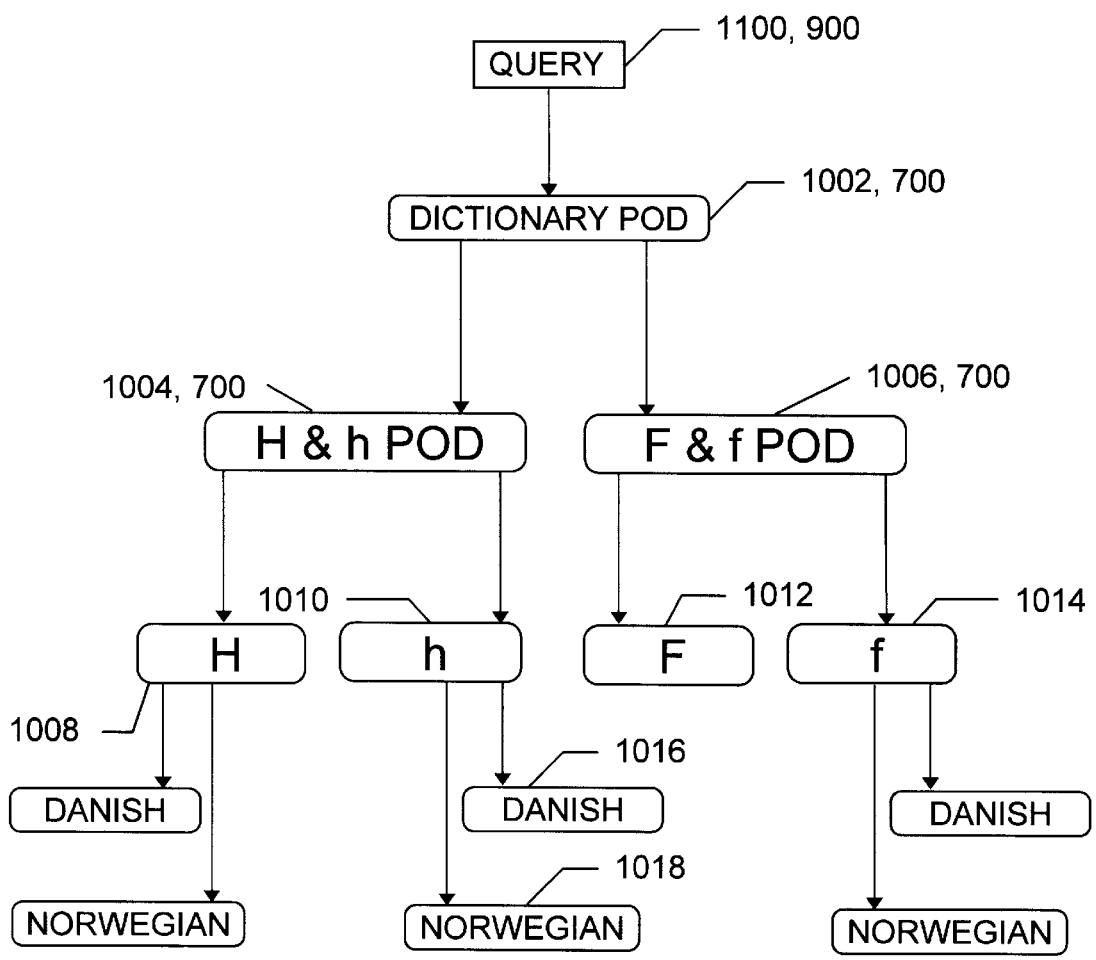
FIG. 11 is a diagram illustrating the denizen processing structure shown in FIG. 10 after it has been dynamically reconfigured.

With reference to FIG. 10 and the earlier Figures, the ODE 100 sends the phrase and translation instructions 1000 to a dictionary pod 1002. The dictionary pod 1002 may be part of the archive pod 808. The dictionary pod 1002 owns ODEs 1016, 1018, 1020 which contain dictionaries of words that start with the ASCII characters "H" or "h". These dictionary ODEs are organized into pods 1004, 1006, 1008, 1010, 1012, and 1014 by character. In the example shown, the ODE 100 spawns multiple threads which check through the "H" ODEs in all languages except English (the native language of the ODE 100 which received the original message) for "Har", "han", and "haft". A reference is also made, and a message is passed to, the pod 1006 which contains "F" and "f" ODEs, and then on to just the "f" pod 1014 and its ODEs. This process of filtering is preferably carried out before the actual comparison request in order to decrease the number of ODEs which must process the request, thus using fewer system resources, and decreasing the time required to process the request.

Several languages use a roman alphabet. Because the original message contained no characters which were non-roman, and because the ODE 100 has no prior experience with this type of request, the ODE 100 places highest priority on languages which have roman characters in them, even if they also include non-roman characters. These languages include the Scandinavian and Germanic languages. Other languages are not written with roman characters, but people who use computers and speak these languages often use accepted roman representations of the words in their language. For example, the Japanese language uses several character sets, one of which uses roman characters. Had the original message been received as Unicode character values which represent characters in any Japanese character set, the request would have given the Japanese ODEs highest weight. As it is, the Japanese ODEs are given lower weight and lower priority but still searched in case these words are roman representation of Japanese words. Weight and priority values are represented in the request by a request value for each word in each language.

An identification probability chart for selected languages is shown below. The initial probability value is based on a value for that language which is stored in a data event path 220 in the dictionary pod 1002, based on the similarity value of a given character set to English. The highest value in this table for a non-English character set is 0.9. The lowest value is 0.1. This probability is assigned to each character set on a curve by dividing the number of characters of a given language's alphabet which are different from the characters in the English alphabet by the number of characters in the language's alphabet which are the same as the characters in the English alphabet. This value is multiplied by the average of the Previous Request value of all words which are searched against ODEs of that language. On the first request, this multiplier is always 1.

| Language | Average Previous Request Value | ID Probability |
| --- | --- | --- |
| Danish | 1 | 0.85 |
| Norwegian | 1 | 0.85 |
| Japanese | 1 | 0.1 |

Shown below is a relationship chart which shows initial request, target destination, and initial value:

| Match Request | Destination Target ODE | Initial Value |
| --- | --- | --- |
| Har | Danish H ODE | 0.85 |
| | Norwegian H ODE | 0.85 |
| | Japanese H ODE | 0.1 |
| han | Danish h ODE | 0.85 |
| | Norwegian h ODE | 0.85 |
| | Japanese h ODE | 0.1 |
| haft | Danish h ODE | 0.85 |
| | Norwegian h ODE | 0.85 |
| | Japanese h ODE | 0.1 |
| ferie | Danish f ODE | 0.85 |
| | Norwegian f ODE | 0.85 |
| | Japanese f ODE | 0.1 |

Working in the processing structure 906, the threads pass "Har" to the appropriate ODEs and request exact variable matches. ODEs 1016 and 1018 for Danish and Norwegian within the "H" pod 1008 both return an exact match. The "h" Danish and Norwegian ODEs also find "han", and the "f" Danish and Norwegian ODEs return an exact match for "ferie". A Danish "h" ODE also finds "haft".

Each thread includes a comparison request and a data request. When a request returns successfully, the return status is 1. If request returns unsuccessfully, the return status is 0. If the return status for the comparison request is 1, then the destination ODE executes the data request. In this example, requests seek the English meaning of each word, the type of each word for each language (verb, noun, and so forth), and the tense of the matched word. After these values are returned to the requesting ODE, they are stored in the data event path 220 for that word, with the return status.

The following chart shows initial request, target destination, initial value, return status, and secondary request values. The secondary request value, which is calculated by finding the average of the initial value and the return status, is used to determine the type and value of further requests. The secondary request value is also the confidence value of the requesting ODE, representing the degree of confidence that the request thread has identified the word correctly.

| Match Request | Destination ODE | Initial Value | Return | Secondary |
| --- | --- | --- | --- | --- |
| Har | Danish H | 0.85 | 1 | 0.925 |
| | Norwegian H | 0.85 | 1 | 0.925 |
| | Japanese H | 0.1 | 0 | 0.05 |
| han | Danish h | 0.85 | 1 | 0.925 |
| | Norwegian h | 0.85 | 1 | 0.925 |
| | Japanese h | 0.1 | 0 | 0.05 |
| haft | Danish h | 0.85 | 1 | 0.925 |
| | Norwegian h | 0.85 | 0 | 0.425 |
| | Japanese h | 0.1 | 0 | 0.05 |

-continued

| Match Request | Destination ODE | Initial Value | Return | Secondary |
|---|---|---|---|---|
| ferie | Danish f | 0.85 | 1 | 0.925 |
|  | Norwegian f | 0.85 | 1 | 0.925 |
|  | Japanese f | 0.1 | 0 | 0.05 |

Below is a list of the words having a return status of 1, and the data returned for those words. "Hints" include word type, and where appropriate, tense:

| Request | Language | Hint | English | Eng. Hint |
|---|---|---|---|---|
| Har | Danish | Present | Has | Present |
|  | Norwegian | Present | Has | Present |
| han | Danish | Pronoun | he | Pronoun |
|  | Norwegian | Pronoun | he | Pronoun |
| haft | Danish | Modal Verb | had | Past |
| ferie | Danish | Noun | vacation | Noun |
|  | Norwegian | Noun | vacation | Noun |

The language identification confidence value can be measured before a request is processed by averaging the request values for the words requested for each language. When the confidence value falls below 0.05, requests are no longer sent to that language's ODEs. Thus, the processing structure 906 shown in FIG. 10 may be dynamically modified to a configuration like that shown in FIG. 11, based on the following preliminary results:

| Language | Language ID Confidence |
|---|---|
| Danish | 0.925 |
| Norwegian | 0.8 |
| Japanese | 0.05 |

Suppose the next request 1100 sent through these request threads asks for the Norwegian equivalent for the word "had", which was the meaning of the word "haft" in Danish. This request might be made to ensure that the word is not misspelled or missing from the database. The only resulting request sent in this cycle is sent to the Norwegian h ODE 1018. If the word returned for this request from the Norwegian database is different than the search term "haft", then the confidence that the message is a Danish sentence will be very high, and the ODE 100 will assume the sentence is indeed Danish. For instance, if the variable value returned by the Norwegian ODE is "hat" the ODE 100 assumes that the language of the original message was Danish, and places the English words retrieved in the request into the grammatical structure for English, which it retrieves from the dictionary ODE 1002: Has he had a vacation?

If the request does not return a usable sentence, or the sentence presented to the user is rejected by the user, then the ODE 100 changes its request processing structure 906 (nodes, inputs, and/or connections). The changes are preferably made in the following order: First, inputs are checked against the database ODEs with the assumption that the input terms are misspelled. Then inputs are checked in combinations to identify truncations of full words. Finally, the words are checked by changing nodes to A but not B, A and B but not C, and so forth.

Additional Examples

The denizen architecture may be used as part of a novel authentication and access method. Assume a traveling sales executive Pat needs access to a corporate intranet. Without the invention, Pat's options may be limited to dialing a long distance telephone number to access the intranet via a dial-in router, or accessing the intranet through an insecure Internet connection.

To use the invention, Pat finds a local Internet service provider who provides access to an operational environment 102. Pat dials the listed local number using a notebook computer. When the system asks for a login account name, Pat's computer instead supplies the name of Pat's personal secure identity ODE and Pat's home ocean 102 routing information. For a password Pat's ODE presents the digital certificate 216. The local Internet service provider gatekeeper ODE 818 verifies the information and gives Pat's ODE the network configuration information necessary to login with that local Internet service provider. After Pat's ODE verifies that it has received the login information successfully, the gatekeeper ODE 818 ends the connection.

Pat's notebook ODE then creates a new dial-up entry, configures the network connection parameters, dials up the local Internet service provider again, and logs on. Pat now has access to the Internet (and thus the intranet) through a trusted Internet service provider, and does not have to pay long distance charges.

The denizen architecture may also be used as part of novel database systems and methods. Suppose a user has the ability to query a database via two interfaces. The user can access a centralized query interface which allows either plain text queries or (via a pull down menu) formatted query pages for various categories such as salon and hair care products. These interfaces may be implemented by an interface ODE. The interface ODE passes the query 900 along to a central node 100, such as a pod or family denizen, within the user's ocean 102.

If the information needed to answer the query is not found within the user's ocean 102, then the query 900 is passed to the river ODE 814, which opens a connection to a central ocean 102. The query 102 is processed by a propagation method through the ocean 102, the family structures, the pods, and then through the ODEs. The propagation method may include learning and communication methods analogous to those discussed above in connection with natural language translation by the processing structure 906.

All database ODEs contain their own internal query code, which allows users to query them simply, regardless of internal data schema. This provides advantages over conventional database systems. A drawback of conventional systems is their inability to adapt to changes in database schema and relationships. With internal query structures, the data structure changes made inside the ODE 100 through learning and dynamic recompilation are transparent to the user and to the system 102 as a whole.

Advanced users can interact directly with database ODEs. ODEs may be self-contained applications having the ability to interact with users by means of a GUI. If the information requested of an ODE 100 through this GUI interface is not contained within the ODE, then the ODE 100 will propagate the query throughout the system 102, as appropriate in view of the permissions of the user and the ODE within the ocean 102.

ODEs also handle natural language translation, currency translation, and data translation via this distributed process. If the ocean 102 within which an ODE 100 resides has the necessary resident translation ODEs, or if the ODE being queried has such translation capabilities, then a user could query the ODE in German and get a response in English, even if the information is stored in French. If the query contains price information, the ODEs can convert the currency values in the query and in all replies to the same currency.

Two general kinds of databases can be accessed using the invention. Database ODEs use a database format which encapsulates a database within an ODE 100 with its query language (such as SQL) intact. Code 228 may contain executable instructions, database records, graphic files, and other data and instructions. Alternatively, an ODE 100 can be spawned which handles interaction with a third-party database using that database's native drivers (ODBC, JDBC, Active X, and so forth), allowing database access either directly or through a third-party database management system. The ODE 100 will translate user queries to native query code on the fly, allowing database structures to change without always forcing the user to modify queries. This allows unusual queries, such as queries which the database management system was not designed to handle.

In many conventional database systems, query optimization is handled by use of an index. This is a table of keywords, with a row key that references another table. It is much faster to read an index and then retrieve rows which match a query than it is to search an entire database in memory. One method of generating indexes is to create them on the fly by simply copying the row number and contents of a given column from a table into an index table. The system can also scan a database row or document for the number or repetitions of a given word. Indexes can also be generated by hand, using multiple keywords to describe the information on that row.

It is often faster to create an index automatically using a database management system (DBMS) than it is to create an index manually. For instance, automatic index generation is typically used by "webcrawlers" that create indexes for use by Internet search engines. Unfortunately, automatically generated indexes tend to be of lower quality, in the sense that they provide less semantic information. If a site has a category of "Bicycle" and a sub-category of "Mountain", a search for the phrase "Mountain Bike" may not identify the site, even though it is extremely relevant, because the keywords used are different and the indexed search relies on close or exact keyword matches. Indexes generated by hand may yield more accurate search results, but they are very difficult to maintain when the information in a database or an integrated database system changes.

ODEs may be used to optimize queries differently. One optimization method is based on propagated information management. For example, assume an engineer for a large long distance telephone company wants to find out how many long distance calls were made from the 801 area code to the 409 area code, in order to find out if the infrastructure is sufficient to handle a projected increase in the number of calls based on population growth in the future. In a normal DBMS, the engineer would have to make the database system find all rows in a very large database which represent customers whose area code is 801 and who made calls to the 409 area code in a given time period. To have an index containing all four of these criteria, or even two of these criteria, in every possible combination, could be very inefficient.

Now consider an approach using the ODE architecture. Assume each customer account is represented by its own database ODE 100 and a data family 706 represents each area code. Within each family 706 there may be pods 700 which represent phone lines by city. The engineer queries the system for all calls from customers in the 801 area code to the 409 area code from the dates of Nov. 20 to Dec. 31, 1996. The system dissects this query into its component parts:

| Column Name | Value |
| --- | --- |
| Customer Area Code | 801 |
| Destination Area Code | 409 |
| Start Date | 19961120 |
| Finish Date | 19961231 |

The system then takes advantage of database ODE filtering capabilities. The following query is sent to all data families: "Binary (True or False) Customer_Area_Code==801". If a data family responds "True" then the system sends the next (and final) query: "Binary Dest_Area_Code==409 and Start_Date==Nov. 20, 1996 and Finish_Date==Dec. 31, 1996".

As the query is propagated through the processing structure 906, a second method of query optimization is performed. When the data ocean administrator 820 creates a database ODE structure, it defines limits on storage functions. In this case, if the limit included ODE creation date and last event date, then all ODEs having last modification dates before Nov. 20, 1996 are filtered out because no calls could have been made to any number if no modifications had been made to that account after Nov. 19, 1996. Likewise, if the account was created after Dec. 31, 1996, then it is also not a candidate for query. This may greatly reduce the number of queries that need to be processed by the system.

The denizen architecture may also be used as part of novel systems and methods for multimedia data object query optimization involving Binary Large OBjectS (BLOBS). Interest in BLOBS has grown with the multimedia industry and the proliferation of online video editing systems. It would be advantageous to integrate efficient BLOB storage and access into more conventional database systems, but the size of the BLOB files involved creates problems.

A two hour movie in MPEG2 format could require 4.8 gigabytes of database storage space, so storing movies can involve a huge database which can only run on powerful servers. This is often price prohibitive and very difficult to maintain. Suppose ten users want to view a particular video file at approximately the same time, but with different offsets into the video and at different sites. One could attempt to load multiple copies of the video into memory, or try to use CPU sharing to send each user chunks of the file on a rotating basis. These approaches involve large hardware expenses.

By using the invention's architecture, however, one can encapsulate the BLOBS in ODEs, with playback code internal to the ODE. Or one can have an internal pointer to the file within or outside of the ocean 102. This allows each ODE to control the playback of the file based on sharing several CPUs within the ocean 102.

In one embodiment, if the video resides on a computer that is not in the data ocean 102, then the ODE can indeed control the playback as described. However, if the video file is encapsulated in an ODE and is larger than the ODE maximum size, then the ODE becomes a pod, spawns new ODEs, and splits the video file into chunks of the same size which are each stored in a different ODE. The pod keeps track of the sections, and what frames/time references exist in each ODE. The user can request playback through the pod, and only the ODE containing the chunk of video which includes the frames that are being played needs to be loaded. This allows the video to be streamed from RAM. This also allows the ODEs playing the video to execute on the machine in the data ocean 102 which can allow the playback to proceed most efficiently. Each playback ODE may execute on a different machine. This approach also permits playback of any section of the video, without having the sections which are not needed at the time to remain archived until needed. Each playback ODE can spawn multiple threads, so that multiple users may view the video stored in that ODE from any point. Also, if the user is viewing the video through a connection which only allows streaming of 15 frames a second, then the ODE will only send every other frame. If the video is stored using a frame-differenced compression method, all frames must be loaded, and decompression will occur on the host. The number of frames the user can download will then be streamed as fast as the user can receive them. If the video is stored in a non-frame-differenced compression, only the number of frames the user's bandwidth allows will be loaded into memory and transmitted.

In summary, the present invention provides a distributed computing architecture including processes that move between various platforms at different locations to optimize performance, detect and attempt to correct internal defects in their own structure, and modify themselves in response to the results of queries or other input. The architecture may be used to advantage in a variety of application areas, including database management, natural language translation, and network authentication and access. Embodiments of the invention draw on tools already known to those of skill in the art, combining them with one another and with novel structures in new and useful ways.

Articles of manufacture within the scope of the present invention include a computer-readable storage medium in combination with the specific physical configuration of a substrate of the computer-readable storage medium. The substrate configuration represents data and instructions which cause the computers to operate in a specific and predefined manner as described herein. Suitable storage devices include floppy disks, hard disks, tape, CD-ROMs, RAM, and other media readable by one or more of the computers. Each such medium tangibly embodies a program, functions, and/or instructions that are executable by the machines to support or perform denizen processes in an operational environment according to the present invention.

Those of skill will appreciate that steps in methods of the invention may be omitted, performed in a different order, or performed concurrently, subject to the requirement that claimed steps cannot be omitted for purposes of literal infringement analysis, and that steps which depend on the results of other steps must be performed only after the required results are available.

This document contains apparent contradictions regarding the placement or content of components such as the components shown in FIG. 2 and in FIG. 10, as well as apparent inconsistencies between the embodiments shown in the drawings and those discussed in the text. However, these apparent contradictions can be resolved by appreciating that this description discusses a variety of alternative embodiments of the invention. Those of skill in the art will readily determine which embodiment to use in a given situation.

Those of skill in the art will also recognize that an embodiment of the present invention need not include all parts of the architecture described above. The invention may be embodied in other specific forms without departing from its spirit or essential aspects. The described embodiments are to be considered in all respects only as illustrative and not restrictive. Section headings are for convenience only. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for utilizing computer system resources according to a computing architecture, the computer system resources including at least two locations, the method comprising the steps of:

obtaining an operational environment for distributed computing processes here termed denizens, each denizen including a configuration portion, an origin portion, and an executable portion, each denizen performing at least one step on itself, the operational environment including at least the two locations and also including a means for denizens to travel between the locations;

providing at least one denizen that is a user denizen;

receiving instructions at the user denizen;

the denizen evaluating different locations in the operational environment in view of the received instructions;

the denizen selecting a location based on that evaluation;

the denizen moving itself to the selected location; and the denizen executing at least a portion of the received instructions at the selected location.

2. The method of claim 1, wherein each location provides access to a processor for executing instructions and each location provides a memory accessible to the processor for storing instructions.

3. The method of claim 1, wherein the executable portion is primarily data.

4. The method of claim 1, wherein the executable portion is primarily instructions.

5. The method of claim 2, wherein the providing step includes providing a user denizen which reproduces and archives itself.

6. The method of claim 5, wherein the providing step includes providing a user denizen which detects an error in itself and attempts to replace itself with an archived version of itself.

7. The method of claim 2, wherein the providing step includes providing a user denizen which reproduces itself.

8. The method of claim 7, wherein the providing step includes providing a user denizen which detects an error in itself and attempts to rebuild itself.

9. The method of claim 2, wherein the providing step includes providing a user denizen which archives itself.

10. The method of claim 2, wherein the providing step includes providing a user denizen which modifies itself in response to the result of executing at least a portion of the received instructions.

11. The method of claim 10, wherein the modifying step uses a neural net learning method.

12. The method of claim 11, wherein the modifying step uses back propagation.

13. The method of claim 10, wherein the modifying step uses an evolutionary algorithm.

14. The method of claim 13, wherein the modifying step uses a genetic algorithm.

15. The method of claim 10, wherein the modifying step uses dynamic recompilation.

16. The method of claim 2, wherein the providing step includes providing a user denizen which modifies itself in response to the result of a change in the operational environment.

17. The method of claim 16, wherein the modifying step occurs in response to a change in available bandwidth.

18. The method of claim 16, wherein the modifying step occurs in response to a change in the availability of computers which support the operational environment.

19. The method of claim 2, wherein the providing step includes providing a user denizen which modifies itself to split processing of a query among additional denizens.

20. The method of claim 2, wherein the providing step includes providing a user denizen which handles exceptions internally to limit the impact of execution errors.

21. The method of claim 2, further comprising the step of supplying at least one administration denizen.

22. The method of claim 21, wherein the supplying step includes supplying an administration denizen which gathers information about different locations in the operational environment and provides that information to a user denizen.

23. The method of claim 21, wherein the supplying step includes supplying an administration denizen which controls access by user denizens to a particular location in the operational environment.

24. The method of claim 2, further comprising the step of furnishing at least one pod denizen which tracks movement of the user denizen between locations in the operational environment.

25. The method of claim 24, wherein the providing step includes providing a plurality of related user denizens, and the pod denizen tracks the locations used by the plurality of user denizens.

26. A computer system implementing an ecosystem computing architecture, the computer system comprising:

an operational environment for distributed computing processes here termed denizens, each denizen including a configuration portion an origin portion, and an executable portion, each denizen performing at least one step on itself, the operational environment including at least two locations, each location providing access to a processor for executing instructions and providing a memory accessible to the processor for storing instructions;

a transport means for denizens to travel between the locations; and at least one denizen that is a user denizen which receives instructions, evaluates different locations in the operational environment in view of the received instructions, selects a location based on that evaluation, moves itself to the selected location, and executes at least a portion of the received instructions at the selected location.

27. The computer system of claim 26, wherein at least two of the locations are on different computers in a computer network.

28. The computer system of claim 26, wherein at least two of the locations are on the same computer.

29. The computer system of claim 26, wherein at least one of the locations provides access to a Java virtual machine.

30. The computer system of claim 26, wherein at least one denizen includes native executable code.

31. The computer system of claim 26, wherein at least one denizen includes interpretable code.

32. The computer system of claim 26, wherein at least one denizen includes platform-independent portable code.

33. The computer system of claim 26, wherein at least one denizen includes source code.

34. The computer system of claim 26, wherein the transport means includes a TCP/IP connection.

35. The computer system of claim 26, wherein the transport means includes means for specifying information for building a denizen by using code stored in a library at a destination location.

36. The computer system of claim 35, wherein the information for building a denizen includes a class identifier.

37. The computer system of claim 35, wherein the information for building a denizen includes an extension to a class.

38. The computer system of claim 35, wherein the information for building a denizen includes class inheritance information.

39. The computer system of claim 27, wherein the configuration portion includes routing information.

40. The computer system of claim 27, wherein the origin portion includes at least one encrypted certificate.

41. The computer system of claim 26, further comprising an archive pod denizen.

42. The computer system of claim 26, further comprising a connection pod denizen.

43. The computer system of claim 26, further comprising an administration denizen.

44. The computer system of claim 43, wherein the administration denizen maintains a log of activities occurring in the operational environment.

45. The computer system of claim 43, wherein the administration denizen supports interactive management of denizens in the operational environment.

46. The computer system of claim 26, further comprising a set of templates which define denizen inheritance information and which can be used to build denizens.

47. The computer system of claim 26, further comprising extension information which can be used to build denizens.

48. The computer system of claim 26, wherein at least one denizen includes at least one executable portion.

49. The computer system of claim 48, wherein the executable portion contains data corresponding to a row of a relational database.

50. The computer system of claim 48, wherein the system contains a plurality of denizens, each denizen includes an executable portion which contains database data, and the data is divided among the denizens according to the value of a database key.

51. The computer system of claim 50, wherein the database key corresponds to a key field in a relational database.

52. The computer system of claim 48, wherein two executable portions in two denizens each reference the same location in memory.

53. The computer system of claim 52, wherein the executable portions each reference the same data.

54. The computer system of claim 52, wherein the executable portions each reference the same instructions.

55. The computer system of claim 26, further comprising means for spawning at least one denizen in response to a query.

56. The computer system of claim 55, further comprising means for gathering results from the at least one spawned denizen.

57. The computer system of claim 26, further comprising means for spawning at least one thread in response to a query.

58. The computer system of claim 57, further comprising means for gathering results from the at least one spawned thread.

* * * * *